United States Patent
Kulhandjian et al.

(10) Patent No.: US 12,050,261 B2
(45) Date of Patent: Jul. 30, 2024

(54) SYSTEM AND METHOD FOR HUMAN AND ANIMAL DETECTION IN LOW VISIBILITY

(71) Applicant: California State University Fresno Foundation, Fresno, CA (US)

(72) Inventors: Hovannes K. Kulhandjian, Fresno, CA (US); Alexander C Davis, Fresno, CA (US); Lancelot Laurence A Leong, Fresno, CA (US); Michael Patrick Richardson Bendot, Ventura, CA (US)

(73) Assignee: California State University Fresno Foundation, Fresno, CA (US)

( * ) Notice: Subject to any disclaimer, the term of this patent is extended or adjusted under 35 U.S.C. 154(b) by 577 days.

(21) Appl. No.: 17/319,080

(22) Filed: May 12, 2021

(65) Prior Publication Data

US 2022/0365200 A1   Nov. 17, 2022

(51) Int. Cl.
*G01S 13/86* (2006.01)
*G08B 13/19* (2006.01)
*G08B 21/04* (2006.01)

(52) U.S. Cl.
CPC ............ *G01S 13/867* (2013.01); *G08B 13/19* (2013.01); *G08B 21/0469* (2013.01)

(58) Field of Classification Search
CPC .... G01S 13/867; G08B 13/19; G08B 21/0469
USPC .......................................................... 342/53
See application file for complete search history.

(56) References Cited

U.S. PATENT DOCUMENTS

| | | | | |
|---|---|---|---|---|
| 7,477,758 B2 * | 1/2009 | Piirainen | ........... | B60R 21/01516 701/44 |
| 7,570,785 B2 * | 8/2009 | Breed | ................... | G06V 40/161 382/115 |
| 7,676,062 B2 * | 3/2010 | Breed | ............... | B60R 21/01552 382/104 |
| 7,768,380 B2 * | 8/2010 | Breed | .................... | G06V 40/10 340/5.82 |

(Continued)

OTHER PUBLICATIONS

Kim, Jong-Hwan, et al., "Firefighting Robot Stereo Infrared Vision and Radar Sensor Fusion for Imaging through Smoke", Fire Technology. 51, (2015), 823-845.

(Continued)

*Primary Examiner* — Nuzhat Pervin
(74) *Attorney, Agent, or Firm* — Schwegman Lundberg & Woessner, P.A.

(57) ABSTRACT

A system to search in a low visibility environment comprising: an infrared (IR) sensor and a radar unit to receive measurements in a first field of view; a microphone to receive audio measurements in a second field of view; processing circuitry to determine presence of an animal and/or human in the first field of view using a first machine learning engine trained based upon the IR image measurements and/or using a second machine learning engine trained based upon the radar image measurements; determine presence of an animal and/or human in the second field of view using a third machine learning engine trained based upon the audio measurements; providing a first digital transmission indicating whether a human and/or animal is detected within the first field of view; and providing a second digital signal indicating whether a human and/or animal is detected within the second field of view.

23 Claims, 18 Drawing Sheets

(56) References Cited

U.S. PATENT DOCUMENTS

| | | | | |
|---|---|---|---|---|
| 7,769,513 | B2* | 8/2010 | Breed | G06V 10/143 |
| | | | | 701/45 |
| 7,983,817 | B2* | 7/2011 | Breed | B60R 21/01536 |
| | | | | 367/137 |
| 8,180,107 | B2* | 5/2012 | Broaddus | G01S 13/867 |
| | | | | 382/103 |
| 8,390,445 | B2* | 3/2013 | Betts | G08B 21/0263 |
| | | | | 600/300 |
| 9,208,678 | B2* | 12/2015 | Albertson | G08B 13/19641 |
| 9,575,169 | B2* | 2/2017 | Colantonio | B64C 1/36 |
| 9,671,493 | B1* | 6/2017 | Khosla | G01S 13/867 |
| 9,958,542 | B2* | 5/2018 | Kuo | G01S 13/56 |
| 10,055,675 | B2* | 8/2018 | Micks | G06F 30/15 |
| 10,121,075 | B2* | 11/2018 | Du | G08B 25/10 |
| 10,257,499 | B2* | 4/2019 | Hintz | H04N 13/271 |
| 10,310,077 | B2* | 6/2019 | Hoare | G01S 13/931 |
| 10,346,725 | B2* | 7/2019 | Weller | G06F 16/907 |
| 10,353,053 | B2* | 7/2019 | Rohani | G01S 7/417 |
| 10,388,009 | B2* | 8/2019 | Kish | G06T 7/001 |
| 10,417,341 | B2* | 9/2019 | Schick | G06F 40/56 |
| 10,451,712 | B1* | 10/2019 | Madhow | G01S 13/723 |
| 10,528,147 | B2* | 1/2020 | Tashev | G01S 7/527 |
| 10,628,714 | B2* | 4/2020 | Pradeep | H04N 7/181 |
| 10,705,185 | B1* | 7/2020 | Lien | G01S 13/66 |
| 10,713,443 | B1* | 7/2020 | Knight | G06F 40/289 |
| 10,732,261 | B1* | 8/2020 | Wang | G01S 7/417 |
| 10,810,881 | B2* | 10/2020 | Jang | G08G 1/167 |
| 10,955,674 | B2* | 3/2021 | Jones | G06F 3/017 |
| 11,151,383 | B2* | 10/2021 | Guttmann | G06V 20/30 |
| 11,155,209 | B2* | 10/2021 | Golov | G06V 20/56 |
| 11,341,185 | B1* | 5/2022 | Hamid | G10L 25/57 |
| 11,501,794 | B1* | 11/2022 | Kim | G10L 15/1815 |
| 11,506,888 | B2* | 11/2022 | Whitmire | G02B 27/0101 |
| 11,531,087 | B2* | 12/2022 | Hu | G08B 21/0469 |
| 2003/0186663 | A1* | 10/2003 | Chen | G06F 18/256 |
| | | | | 455/226.3 |
| 2006/0251293 | A1* | 11/2006 | Piirainen | B60R 21/01552 |
| | | | | 382/104 |
| 2008/0051957 | A1* | 2/2008 | Breed | G06V 20/593 |
| | | | | 701/36 |
| 2008/0069403 | A1* | 3/2008 | Breed | B60K 28/066 |
| | | | | 382/104 |
| 2008/0292146 | A1* | 11/2008 | Breed | B60N 2/002 |
| | | | | 382/118 |
| 2011/0032139 | A1* | 2/2011 | Benitez | G01S 13/56 |
| | | | | 342/28 |
| 2011/0285982 | A1* | 11/2011 | Breed | G06V 20/59 |
| | | | | 356/614 |
| 2017/0371035 | A1* | 12/2017 | Anvari | G01S 13/93 |
| 2018/0018987 | A1* | 1/2018 | Zass | G10L 25/72 |
| 2018/0103248 | A1* | 4/2018 | Hintz | H04N 13/218 |
| 2018/0150698 | A1* | 5/2018 | Guttmann | G06V 20/41 |
| 2019/0225232 | A1* | 7/2019 | Blau | G05D 1/0088 |
| 2019/0391581 | A1* | 12/2019 | Vardaro | A61B 5/02055 |
| 2020/0103499 | A1* | 4/2020 | Preece | G06N 3/04 |
| 2020/0166611 | A1* | 5/2020 | Lin | G01S 13/0209 |
| 2020/0264300 | A1* | 8/2020 | Rostami | G01S 13/867 |
| 2020/0292694 | A1* | 9/2020 | Fleming | G01S 13/825 |
| 2020/0294314 | A1* | 9/2020 | Jones | G06F 3/0346 |
| 2020/0337272 | A1* | 10/2020 | Kumar | A01K 29/005 |
| 2020/0355817 | A1* | 11/2020 | Gillian | G01S 7/4026 |
| 2020/0389624 | A1* | 12/2020 | Oberholzer | H04N 7/18 |
| 2021/0065733 | A1* | 3/2021 | Sallem | G10L 15/08 |
| 2021/0088784 | A1* | 3/2021 | Whitmire | G02B 27/0101 |
| 2021/0231775 | A1* | 7/2021 | Pezeshk | G01S 7/417 |
| 2021/0278529 | A1* | 9/2021 | Veerayya | B64D 45/00 |
| 2022/0046190 | A1* | 2/2022 | McCauley | G01J 5/025 |
| 2022/0128657 | A1* | 4/2022 | Kale | G01S 13/867 |
| 2022/0169381 | A1* | 6/2022 | Alrasheed | B64C 39/024 |
| 2022/0308200 | A1* | 9/2022 | Becker | G01S 7/417 |
| 2022/0311788 | A1* | 9/2022 | Prasad Koppisetti | |
| | | | | H04W 12/128 |

OTHER PUBLICATIONS

Ulrich, Michael, et al., "Person Recognition based on Micro-Doppler and Thermal Infrared Camera Fusion for Firefighting", 2018 21st International Conference on Information Fusion (Fusion), (2018), 919-926.

\* cited by examiner

SYSTEM AND METHOD FOR HUMAN AND ANIMAL DETECTION IN LOW VISIBILITY

BACKGROUND

First responders are tasked with high-stress difficult situations in search and rescue operations where vision can be obstructed with smoke, fog, and debris. Time can be of the essence in rescuing humans and animals from a damaged or burning structure. Locating victims in a smoke-filled environment can be hazardous. Humans and animals can be difficult to locate due to injury or sheltering or being asleep and unaware of the danger. Therefore, there is a need to augment the sensory capabilities of search in high risk situations so that first responders can carry out efficient searches while maintaining a safe distance from dangerous situations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
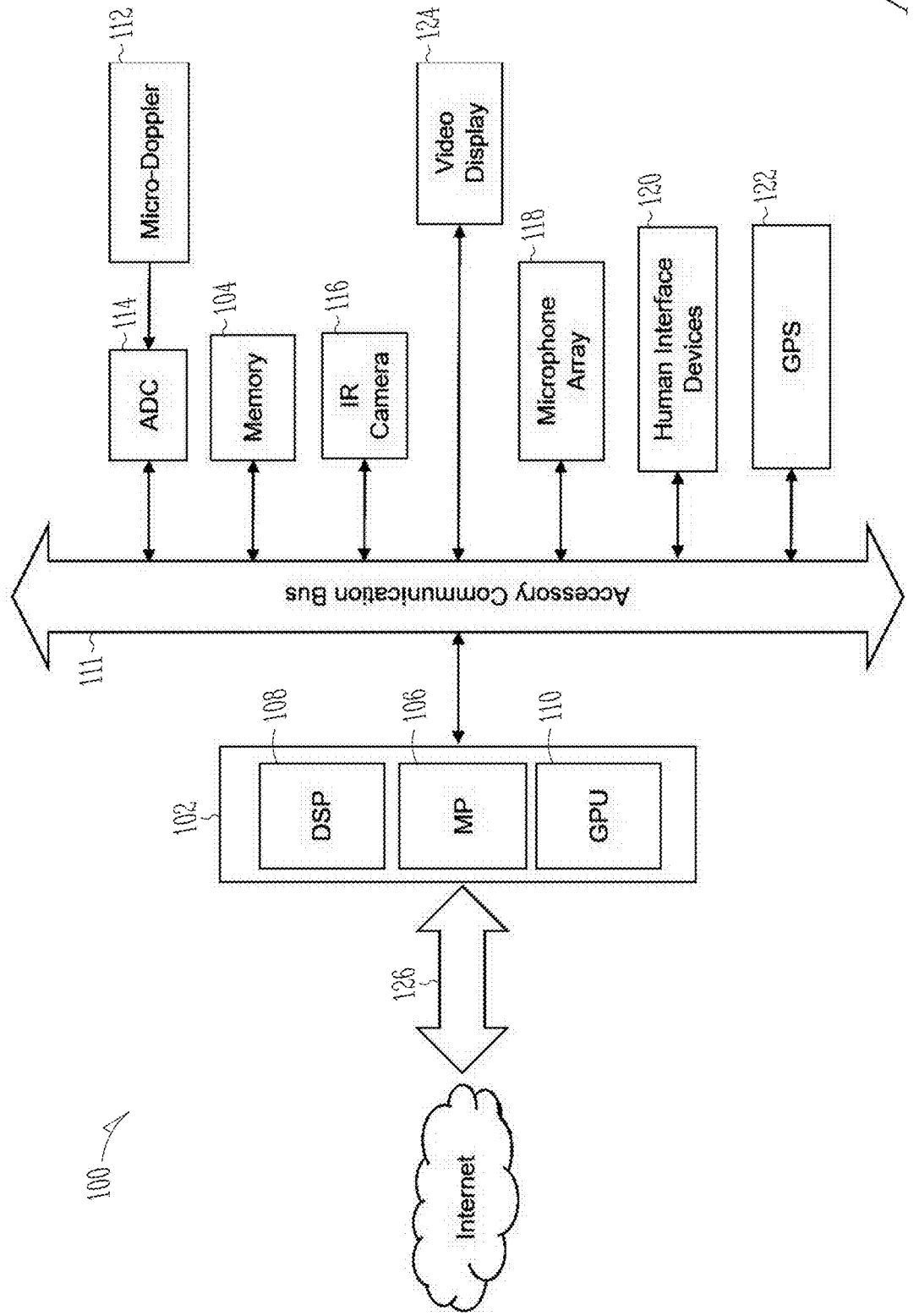
FIG. 1 is an illustrative block diagram of an example electronic detection system for human and animal detection.

FIG. 1 is an illustrative block diagram of an example electronic detection system 100 for human and animal detection. The system 100 includes processor circuitry 102 that includes one or more processors and one or more memory storage devices 104 to store instructions executable by the processor circuitry and to store data. Example processor circuitry 102 includes one or more integrated circuits including a general purpose microprocessor (MP) circuit 106, a digital signal processing (DSP) circuit 108 suitable for audio signal processing, and a graphics processing unit (GPU) circuit 110 suitable for machine learning-training of neural networks The system includes a data communication bus 111. A micro-Doppler radar ("radar") unit 112, which includes a radar transceiver unit that includes a transmitter configured to transmit radio frequency (RF) radar signals into a radar field of view and a receiver configured to receive reflected RF radar signal indicating radar measurements such as distance and angle information, reflected from a target in the radar field of view, to convert the reflected radar data to digital radar data, and to provide the digital radar data to the bus 111. In an example system 100, the radar unit 112 is coupled to an analog-to-digital converter (ADC) circuit 114 that is coupled to convert analog radar signals received from a target to digital signals and to provide the digital radar signals to the bus 111. An infrared (IR) camera sensor 116 is coupled to sense IR energy emanating from an IR sensor field of view and to convert the sensed IR energy to digital IR data and to provide the IR data to the bus 111. A microphone array 118 is coupled to sense audio sound pressure waves and to convert the sensed audio sound pressure waves to digital audio data to the bus 111.

A human user interface system 120 is coupled to visually and audibly transmit information to a user and to receive user input to control the system operation. An example user interface system 120 includes a touch screen display to display visual information and to receive tactile user input, multiple physical manual switches, a microphone to receive verbal commands from the user, and a speaker to transmit audible information to the user. The microphone also can be used to receive audio information from a physical search environment speaker (e.g., a burning building) and to transmit audio information to the physical search environment. A global positioning system (GPS) circuit block 122 is coupled to provide geographic physical location data to the bus 111. A video display device 124, which is also part of the user interface system 122, is coupled to the bus 111 to visually transmit information to a user. IR information, radar information, and audio information can be displayed using the display device. The displayed information can include scene images and measurements, such as direction to a target object (e.g., human or animal), or distance from the target object determined based upon one or more of IR, radar, and audio data, for example. The processor system 100 includes a network interface 126, which can be wired or wireless, to provide access to a communications network 128 such as the internet as well as to a local area network (LAN), on which to transmit one or more of the IR, radar, and audio data, scene images and/or measurements for sharing and analysis by other users or systems (not shown), for example.

Figure 2A:
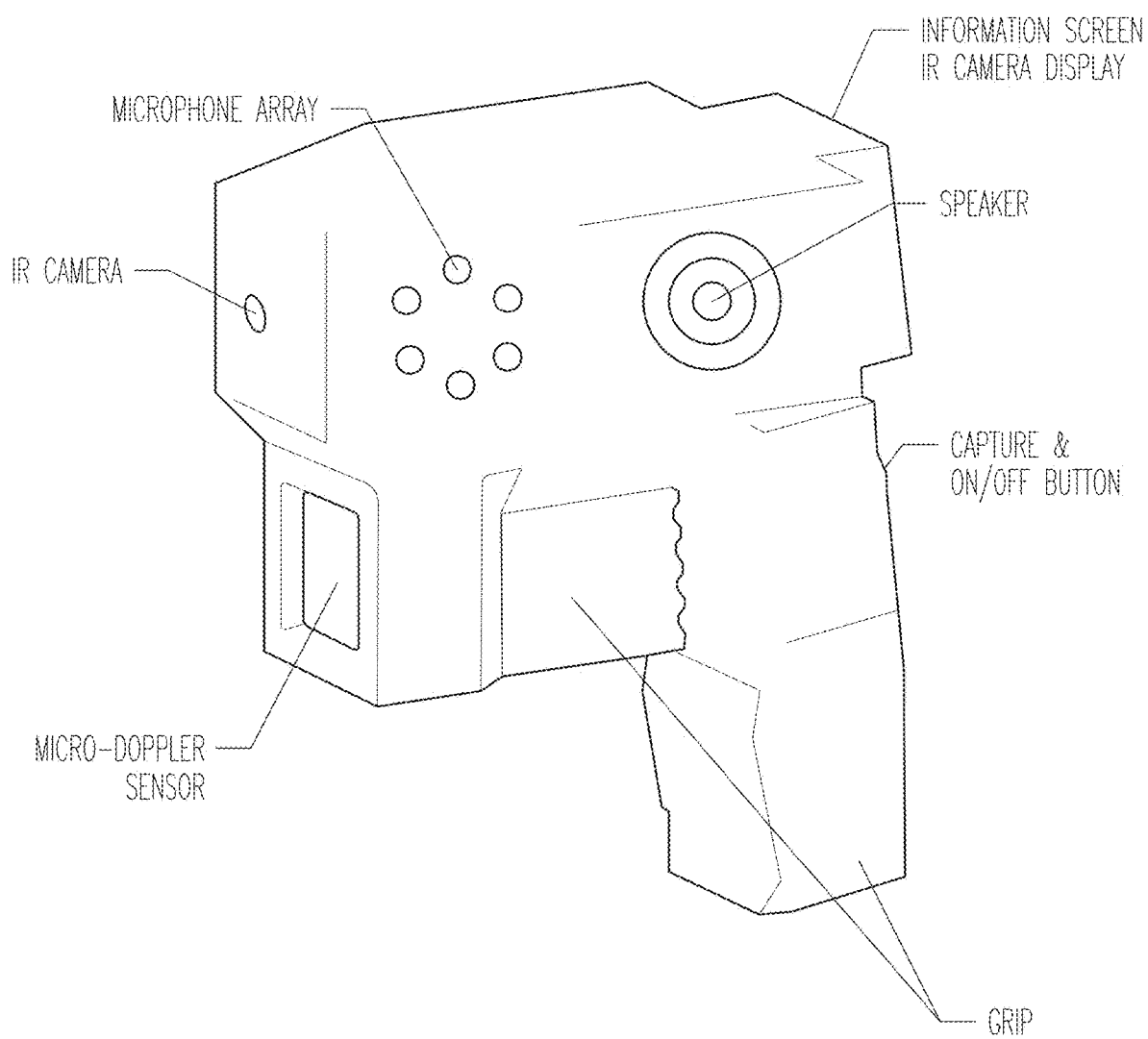
FIG. 2A is a first perspective view of an example first handheld housing assembly enclosing the system of FIG. 1.
Figure 2B:
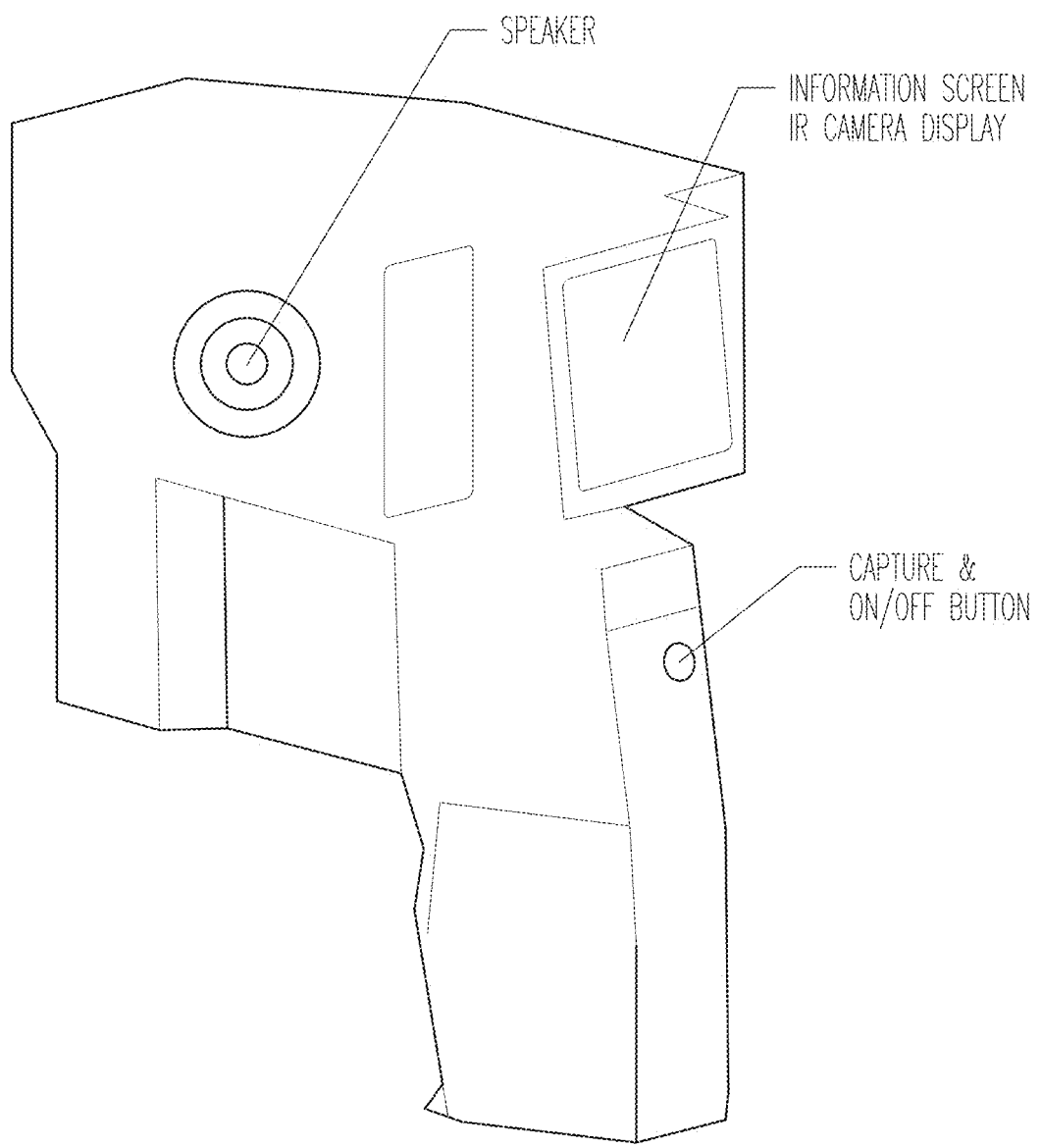
FIG. 2B is a second perspective view of the first handheld housing enclosing the system of FIG. 1.

FIG. 2A is a first perspective view of an example first handheld housing assembly 200 enclosing the system 100 and showing the IR, radar, and audio array sensors 116, 112, 118, respectively, and a speaker 202 mounted to the housing 200. The IR sensor 116 includes a FLIR (Forward Looking InfraRed) camera. The radar sensor 112 includes an antenna to transmit RF radar pulse signals and to receive RF radar signals reflected from a target object. The audio sensor 118 includes an array of microphones $118_1$-$118_6$ that are geometrically separated from one another to permit detection of different times of arrival of sensed audio signals. The speaker 202 is mounted to allow audible information transmission to the system user (e.g., messages reporting objects detected by the sensors) as well as transmission of messages to a victim (e.g., urging safety precautions). FIG. 2B is a second perspective view of the housing assembly 200 showing the video display screen 204 visible to a user to display images produced based upon data captured by one or more of the IR, radar, and audio sensors 116, 112, 118, respectively. The housing assembly 200 also mounts multiple physical control buttons 206 of the human user interface that can receive user control input. The housing assembly 200 includes a handle 206 that a user can grip to hold the housing assembly 200. An example handle 206 can include physical control surfaces such as buttons, switches, and sliders (not shown) that a user can actuate to provide input to the human interface block 120 to control (display IR image, display micro-Doppler spectrogram, etc.) An alternative head-mounted goggle housing assembly (not shown) can be used to house the system to free-up a user's hands during a search operation.

Figure 3:
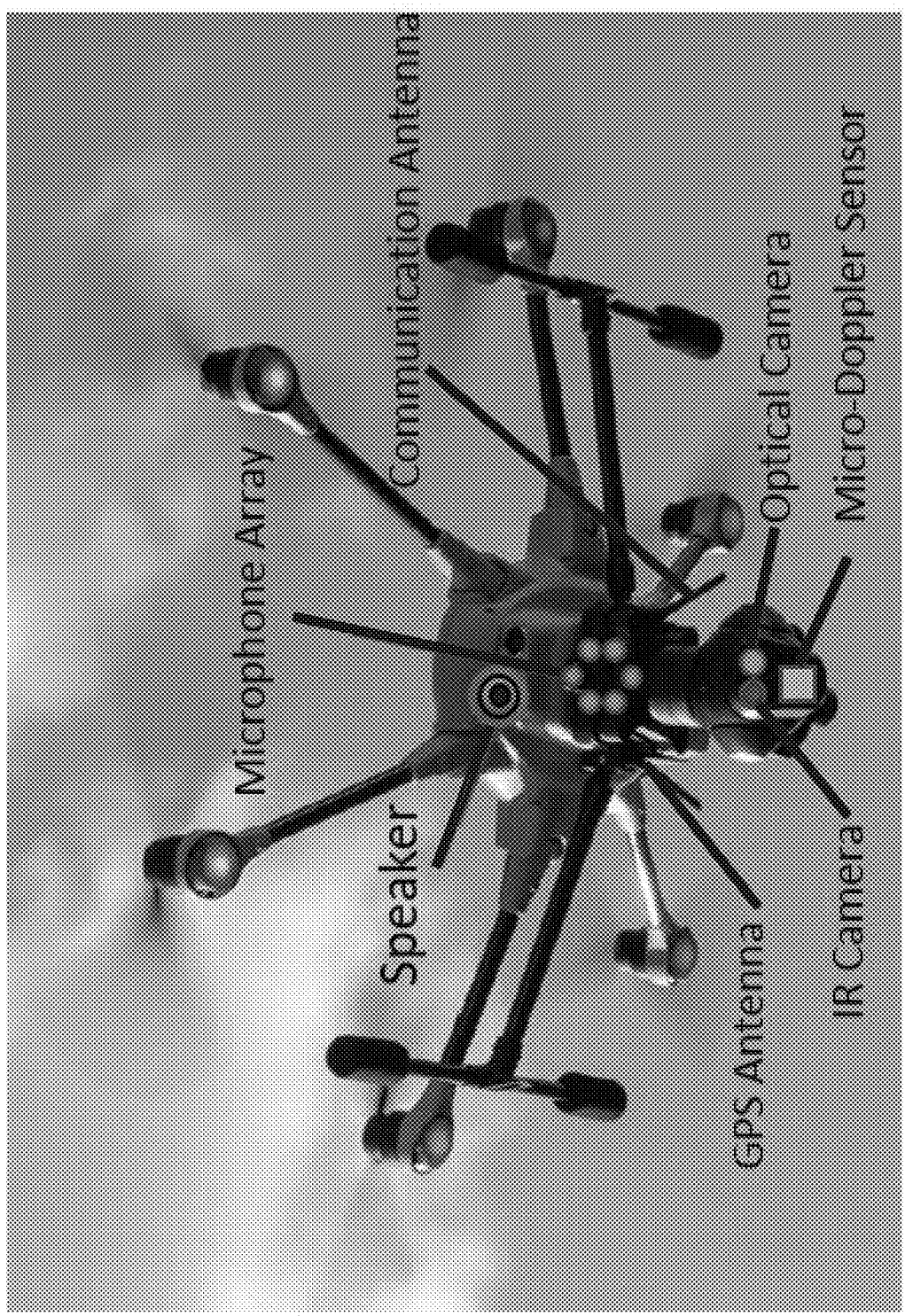
FIG. 3 is a perspective view of an example aerial drone robot mounting the system of FIG. 1.

FIG. 3 is a perspective view of an example aerial drone robot 300 mounting the system 100. The example drone 300 includes six propellers 302 powered by a motor system 304 to hold it aloft. An IR camera sensor 116 is mounted to the drone. A radar transceiver unit 112 including an antenna is mounted to the drone. A microphone array 118 is mounted to the drone. A speaker 302 is mounted to the drone. Additionally, the drone 300 includes an additional embedded visible light/optical camera 306. The drone mounted system can provide an arial view of a scene, such as a burning structure, while a user such as a first responder, remains at a safe distance.

Figure 4:
FIG. 4 is a perspective view of an example terrestrial (ground-based) robot mounting the system of FIG. 1.

FIG. 4 is a perspective view of an example terrestrial (ground-based) robot 400 mounting the system 100. The example terrestrial robot 400 includes terrestrial vehicle, in this case a tractor mounted on a track system 402. An IR camera sensor 116 is mounted to the robot. A radar transceiver unit 112 including an antenna is mounted to the robot. A microphone array 118 is mounted to the robot. A speaker 402 is mounted to the robot. A visible light/optical camera 406 is embedded on the robot. The terrestrial robot 400 mounted system 100 can provide a ground-based view of a scene, such as a burning structure, while a user such as a first responder, remains at a safe distance.

Figure 5:
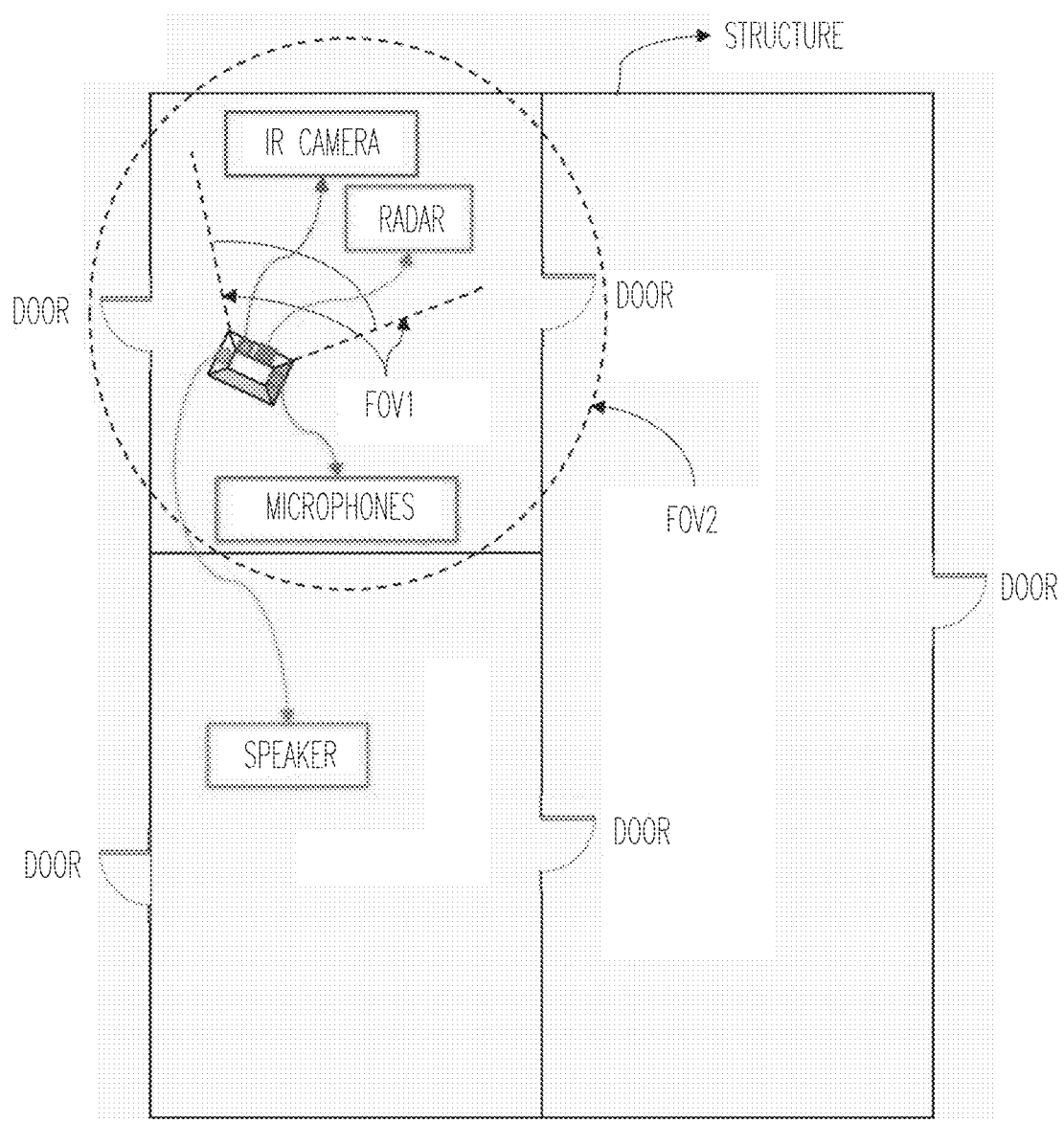
FIG. 5 is an illustrative drawing representing a first field of view of the IR and radar sensors and a second field of view of the audio sensors.

FIG. 5 is an illustrative drawing representing a first field of view (FOV1) of the IR and radar sensors 116, 112 and a second field of view (FOV2) of the audio sensors 118. The IR and radar sensors 116, 112 are aligned to share a common first field of view (FOV1). The first field of view includes a relatively narrow and focused region. An example first field of view includes a cone-shaped region in which the IR and radar sensors 116, 112 respectively sense IR energy and reflected RF radar signals from within a search environment, such as a room within a burning structure 500. The second field of view (FOV2) is wider than the first field of view (FOV1). An example second field of view includes a portion of the search region such as a semi-spherical region that extends outward in all directions from the microphone array 118. The first and second field of view overlap one another. IR and radar information collected from within the first field of view (FOV1) can permit a user to pinpoint location of a human or animal within the search region, much like a visual display within an optical camera field of view (not shown). The audio information captured from within the wider second field of view (FOV2) can provide a user with wider situation awareness to suggest to the user where next to direct the IR and radar sensors 116, 112 to pinpoint the location of a human or animal, for example. The audio sensors 118 often cannot provide location of the human or animal with the same accuracy as the IR/radar sensors 116, 112 can, but they can be used to guide the IR/radar closer to where that location. Thus, the IR/radar sensors 116, 112 and the audio sensors 118 operate simultaneously in a complementary manner. The IR/radar sensors 116, 112 provide detailed location information for objects in a narrow first field of view (FOV1). The audio sensors 118 provide more general location information within a wider second field of view (FOV2). In addition to that the audio sensors 118 provide more details on the object detected in the narrow first field of view, the detected human is a man or a child, are they shouting for help or not, etc., for example.

Figure 6:
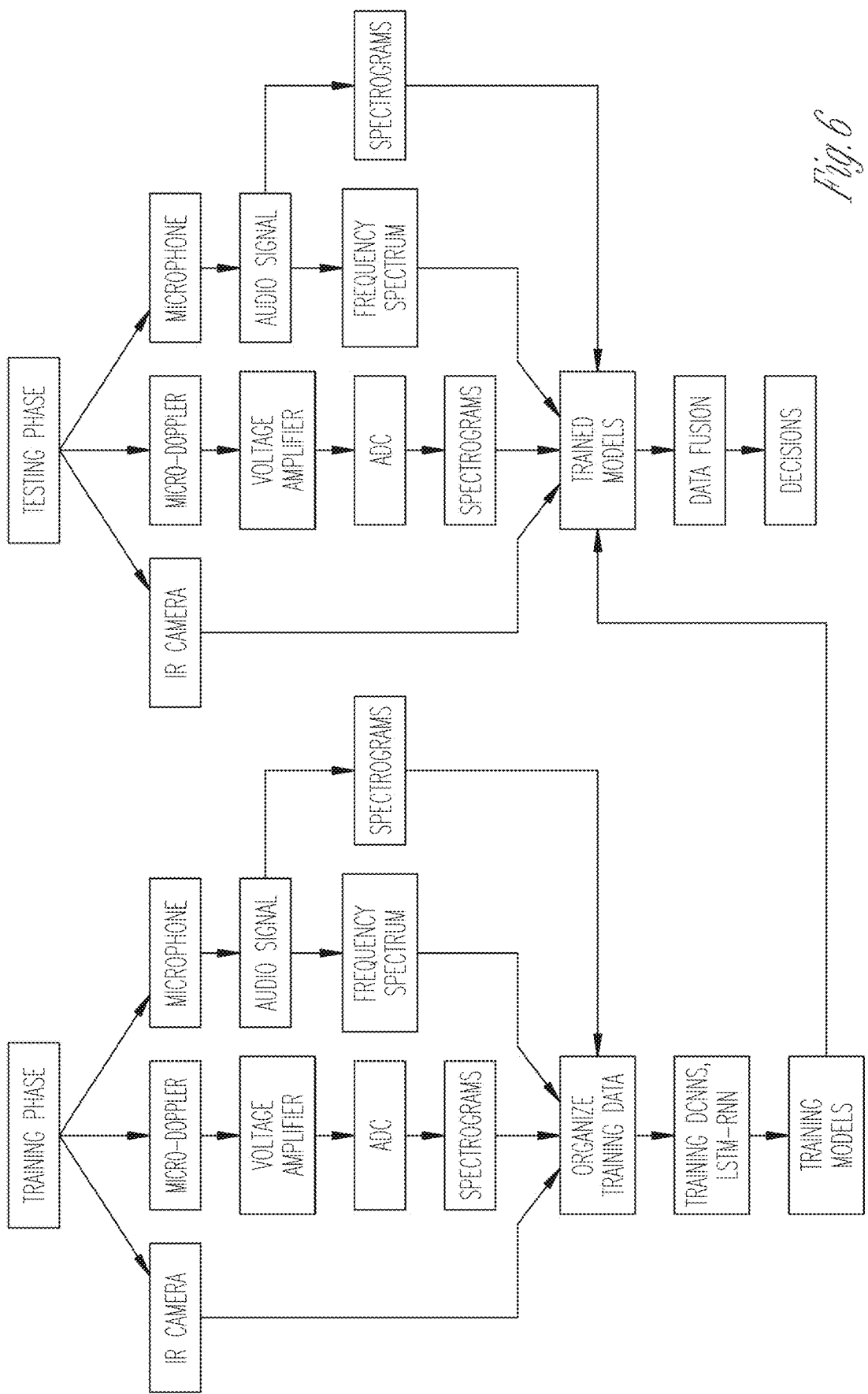
FIG. 6 is an illustrative flow diagram representing an operational configuration of the system of FIG. 1.

FIG. 6 is an illustrative flow diagram representing an operational configuration 600 of the system 100 of FIG. 1. The processor circuitry 102 of FIG. 1 includes one or more processor devices 106, 108, 110 operatively coupled to one or more non-transitory information storage devices 104 that store instructions to configure the processing circuitry 102 to use the components of the system 100, including the processing circuitry itself, to perform the operations described below. The operational configuration 600 of the system 100 includes a first system training operations data flow path 602 and includes a second system testing and use operations dataflow path 604. During training, a rich dataset of different training scenes are used as sources of radar data, IR data and audio data to train multiple neural networks across a wide range of different scenarios, for example. Conversely, during testing, a rich dataset of different testing scenes are used as sources of radar data, IR data and audio data to test the multiple trained neural networks across a wide range of different scenarios, for example.

Referring to the system training operations dataflow path 602 of FIG. 6, the micro-Doppler radar system 112 transmits RF radar signals toward a training scene, senses RF radar signals reflected from the scene, and produces analog voltage signals based upon the reflected RF radar signals. A voltage amplifier circuit 606 amplifies the radar voltage signals. The ADC circuit 114 converts the analog radar voltage signals to digital radar voltage signals. A spectrogram transform block 608 comprises the processor system 102 configured with instructions to transform the digital radar voltage signals to a spectrogram representation and to save the radar spectrogram to memory 104. The microphone array 118 receives audio signals propagated from the training scene and saves the received audio signals in one or more audio files 610. An audio frequency spectrum transform block 612 comprises the processor system 102 configured with instructions to transform the audio signal to an audio frequency spectrum representation of the audio signal, and to save the audio frequency spectrum to memory 104. An audio spectrogram transform block 614 comprises the processor system 102 configured with instructions to transform the audio signal to an audio spectrogram transform representation of the audio signal and to save the audio spectrogram to memory 104. The IR camera 116 captures IR images of the training scene, resizes the captured IR images to a smaller size for neural network training purposes, described below, and saves the resized IR images to memory 114. The training data block 616 represents the processor system 102 configured with instructions to operate as a memory management system to organize the saved radar, IR and audio training datasets into multiple categories for use as benchmark or ground truth data for use in multiple different classifications. Certain details of example training data organization are explained below with reference to FIG. 7. An example Machine learning (ML) block 618 comprises the processor system 102 configured with instructions to train multiple neural networks based upon the training data. Details of neural networks are explained below with reference to FIGS. 8, 9, 10, 13. The training operation results in multiple machine learning-trained engines 620 that trained to evaluate a wide range of possible real-world situations.

Persons skilled in the art will understand that spectrograms can be created from a time-domain signal in several ways. For example, a spectrogram can be approximated as a filter bank that results from a series of band-pass filters (this was the only way before the advent of modern digital signal processing), or can be calculated from the time signal using the Fourier transform or can be calculated based upon a wavelet transform, for example. These filter bank and Fourier transform methods actually form two different time—frequency representations that are equivalent under some conditions. The bandpass filters method ordinarily involves analog processing to divide the input signal into frequency bands; the magnitude of each filter's output controls a transducer that records the spectrogram as an image on paper. Creating a spectrogram using the FFT involves a digital process. Digitally sampled data, in the time domain, is broken up into chunks, which ordinarily overlap, and is Fourier transformed to calculate the magnitude of the frequency spectrum for each chunk. Each chunk then corresponds to a vertical line in the spectrogram image; a measurement of magnitude versus frequency for a specific moment in time (the midpoint of the chunk). These spectrums or time plots are then "laid side by side" to form the image or a three-dimensional surface, or slightly overlapped in various ways, i.e., windowing. This process essentially corresponds to computing the squared magnitude of the short-time Fourier transform (STFT) of the audio signal.

Referring to the system testing and use operations data flow 604 of FIG. 6, the operation blocks used for collection and transformation of the radar, IR and audio data operate the same way in the testing and use operations data flow 604 as they do in the training operations dataflow path 602 and therefore, will not be described again. Classifier block 622 comprises the processor system 102 configured with instructions to use the multiple machine learning-trained engines 620 to produce classifications based upon radar data, to produce one or more classifications based upon IR data and to produce one or more classifications based upon audio data. More particularly, an example processor system 102 is configured to operate as a first example machine learning-trained engine that includes a first trained neural network 800 to classify an object based upon radar data; to operate as second example machine learning-trained engine that includes a second trained neural network 900 to classify the object based upon IR data; to operate as a third example learning-trained engine that includes a third trained neural network 1000 to classify the object based upon audio data; and to operate as a fourth example machine learning-trained engine that includes a fourth trained neural network 1300 to interpret content of sound within a scene based upon audio data. In an example system 100, the processor system 102 is configured to operate the fourth machine learning-trained engine as a speech recognition device. For each test object/scene the radar data, IR data and audio data, in transformed form, are provided as indicated by the classifier block 622, which represents the multiple trained neural network machine learning-trained engines that are trained during the training function to operate as classifiers. Data fusion block 624 comprises the processor system 102 configured with instruction to operate as a data fusion system that fuses classifications produced at the classifier block 622 by the individual machine learning-trained engines in response to the radar, IR and audio test data. The data fusion block 624 produces a multivariate decision output at decision block 626. An example processor system 102 produces one or more digital transmissions used to generate visual output at the screen display 124, used to generate audio output at the speaker 202, 302, 402 and used to generate electronic signal output over a network 128 based upon the decision output at decision block 626.

Figure 7:
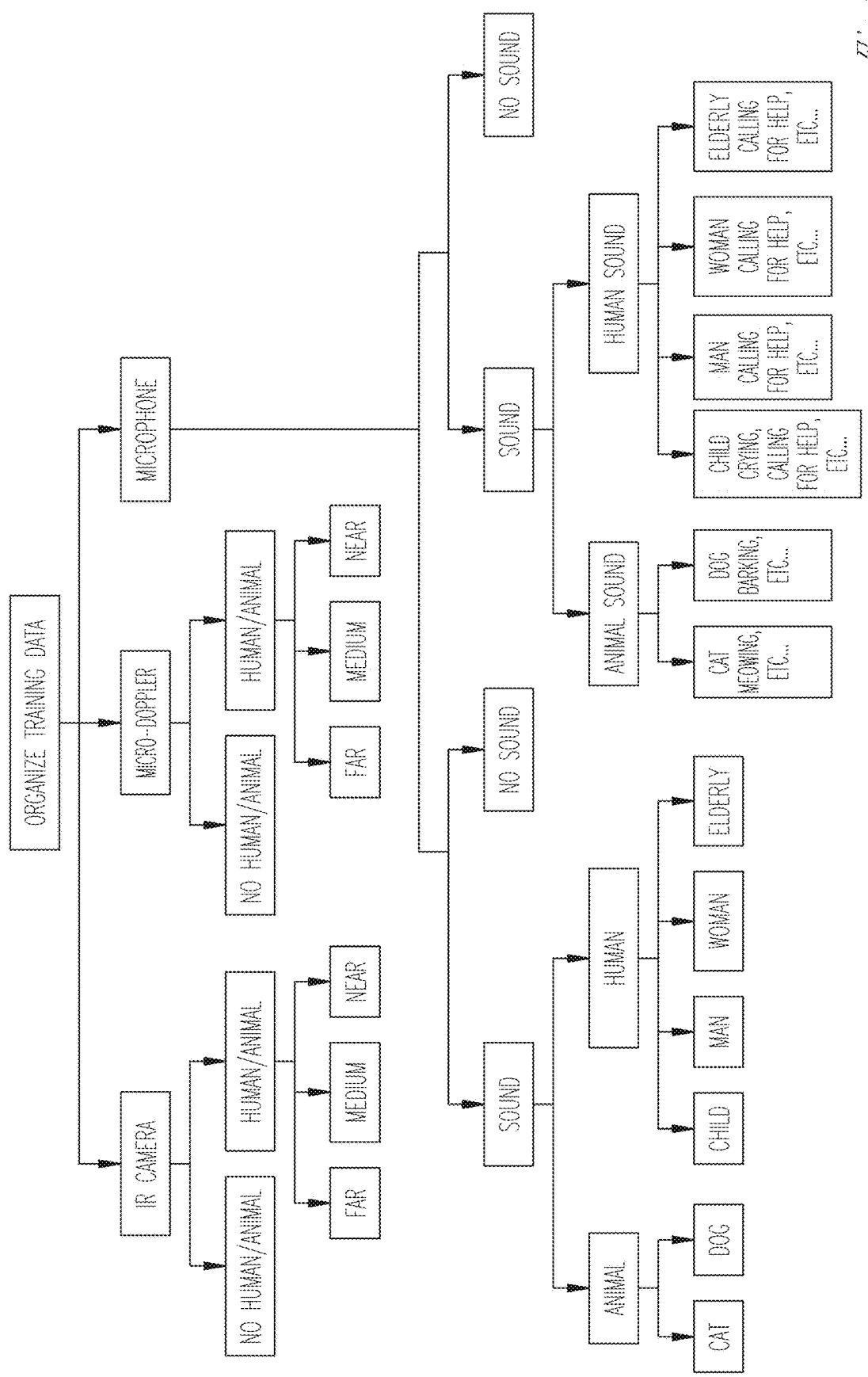
FIG. 7 is an illustrative training data hierarchy structure indicating logical relationships among training data used to train multiple machine learning-trained engines.

FIG. 7 is an illustrative training dataset hierarchy structure 700 indicating logical relationships among training data of a training dataset stored in one or more non-transitory information storage devices and that is used to train the neural network machine learning-trained engines. During neural network training, the IR sensor 116, radar sensor 112, and audio microphones 118 capture data from each of a multiplicity of training scenes. Classifications of IR, radar and audio training data within the training dataset are known in advance for each training object/scene. Training data are labeled according to classifications described below. The captured training data are organized in a data structure according to their classification labels.

In an IR camera training dataset hierarchy 702, a first classification at a first level of the IR training dataset hierarchy is labeled, No Human/Animal, which signifies that neither a human nor an animal is present in the scene. At a second level of the IR camera training dataset hierarchy, second through seventh classifications are labeled, Human Far distance, Human Medium distance, Human Near distance, Animal Far distance, Animal Medium distance, Animal Near distance, respectively. Each IR classification label corresponds to an IR data storage folder in a non-transitory storage device. IR data is stored in an IR storage folder corresponding to the known classification of the scene. Accordingly, for example, IR data for a scene known to have a human at medium distance is stored in the second dataset hierarchy level at the third IR folder storage location corresponding to the IR classification label, Human Medium distance.

Similarly, in a radar training dataset hierarchy structure 704, a first classification at a first level of the radar training dataset hierarchy is labeled, No Human/Animal, which signifies that neither a human nor an animal is present in the scene. At a second level of the radar training dataset hierarchy, second through seventh classifications are labeled, Human Far distance, Human Medium distance, Human Near distance, Animal Far distance, Animal Medium distance, Animal Near distance, respectively. Each radar classification label corresponds to a radar data storage folder in a non-transitory storage device. Transformed Radar data is stored in a radar storage folder corresponding to the known classification of the scene. Accordingly, for example, transformed radar data for a scene known to have an animal at a far distance is stored in the second dataset hierarchy level at the fifth radar folder storage location corresponding to the radar classification label, Animal Far distance.

An example microphone (audio) training dataset hierarchy 706 is more complex since it includes a first audio training dataset hierarchy $706_1$ for the audio frequency spectrum transform of the audio data and a second audio training dataset hierarchy $706_2$ for the audio spectrogram transform of the audio data. The first audio training dataset hierarchy $706_1$ for the audio frequency spectrum transform of the audio data includes a first classification labeled, No Sound, which signifies that no sound is detected in the scene. At a second level of the audio training dataset hierarchy for the audio frequency spectrum transform of the audio data, second through seventh classifications are labeled, Sound Animal Cat, Sound Animal Dog, Sound Human Child, Sound Human Man, Sound Human Woman, and Sound Human Elderly, respectively. Each radar classification label corresponds to an audio data storage folder within the first audio training dataset hierarchy for the audio frequency spectrum transform of the audio data stored in a non-transitory storage device. Transformed Radar data is stored in a radar storage folder corresponding to the known classification of the scene. Accordingly, for example, transformed audio data for a scene known to have sound of a child is stored in the second dataset hierarchy level at the fourth audio folder storage location corresponding to the audio classification label, Sound Human Child.

The second audio training dataset hierarchy $706_2$ for the audio spectrogram transform of the audio data includes a first classification labeled, No Sound, which signifies that no sound is detected in the scene. At a second level of the audio training dataset hierarchy for the audio spectrogram transform of the audio data, second through seventh classifications are labeled, Sound Animal Sound Cat, Sound Animal Sound Dog, Sound Human Sound Child, Sound Human Sound Man, Sound Human Sound Woman, and Sound Human Sound Elderly, respectively. Each classification includes additional audio content interpretation information, associated with the classification, that interprets the information content of a sound such as speech recognition, for example. In an example training dataset hierarchy for the audio spectrogram transform of the audio data, the interpretation falls within a predetermined category. In an example audio training dataset hierarchy for the classification label, Sound Animal Sound Cat, the sound interpretation categories include, meowing. In an example audio training dataset hierarchy for the classification label, Sound Human Sound Child, the sound interpretation categories include, crying and include calling for help.

Figure 8:
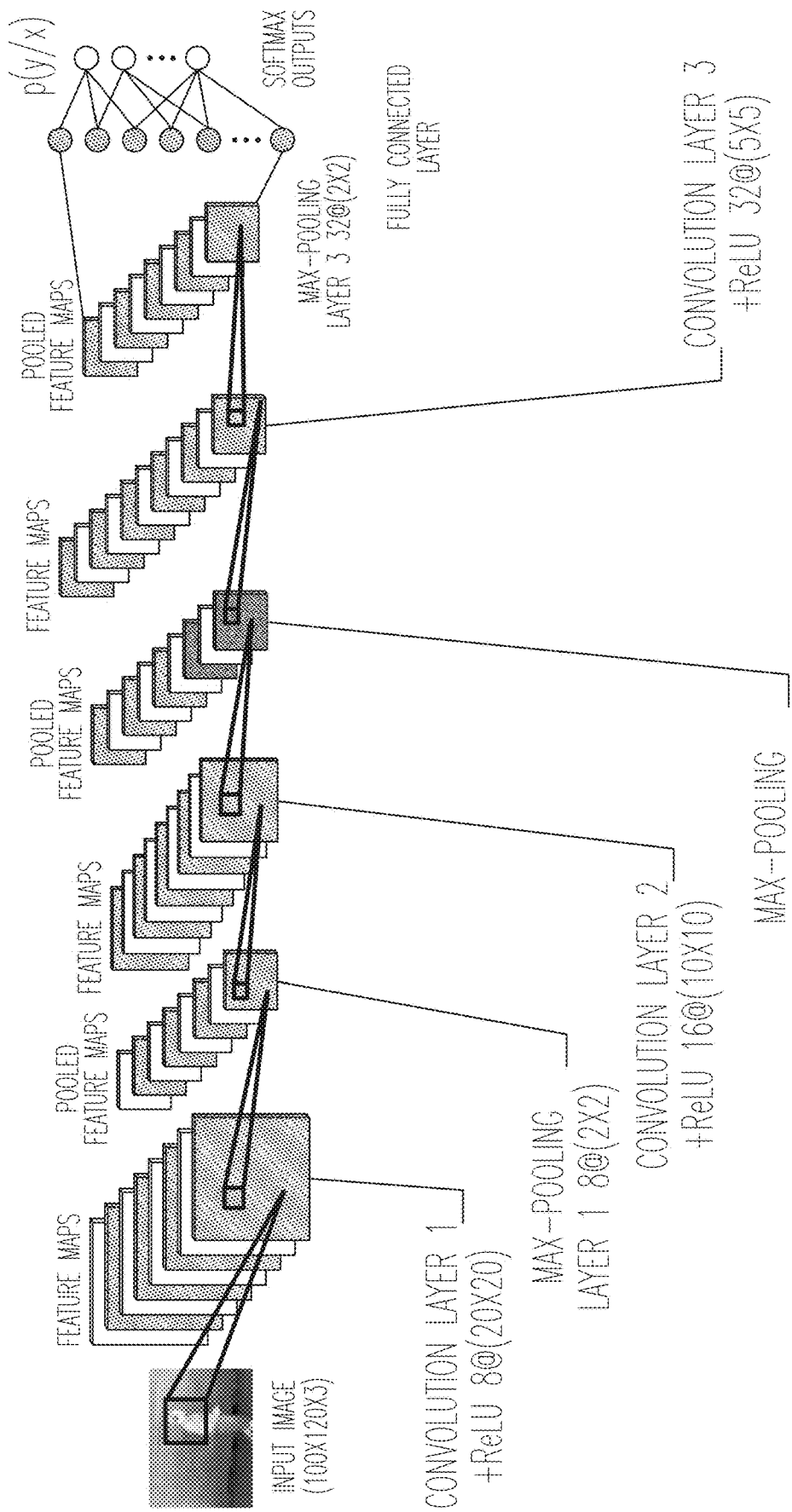
FIG. 8 is an illustrative diagram of an example first deep convolutional neural network (DCNN) of an example first machine learning-trained engine.
Figure 9:
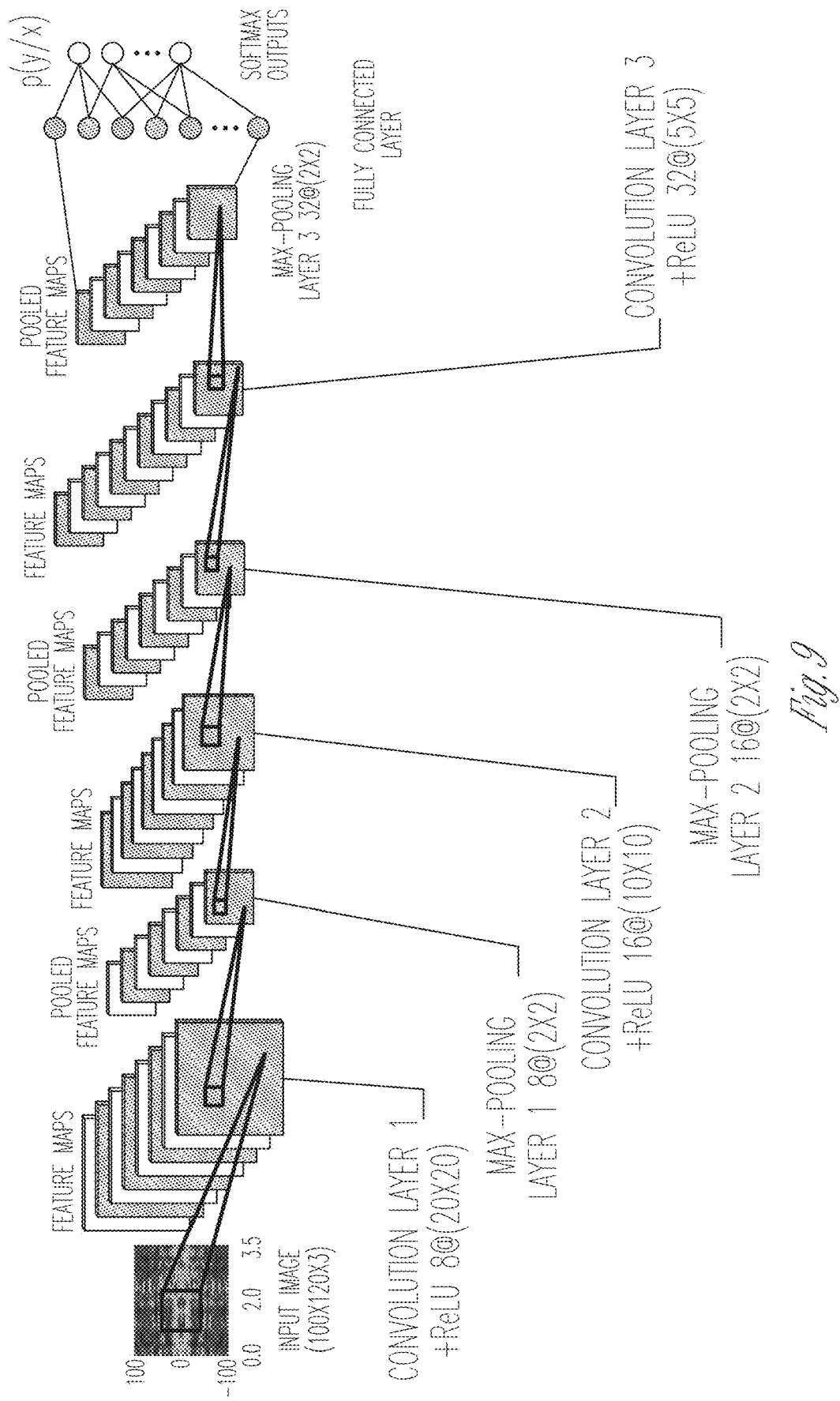
FIG. 9 is an illustrative diagram of an example second DCNN of an example second machine learning-trained engine.
Figure 10:
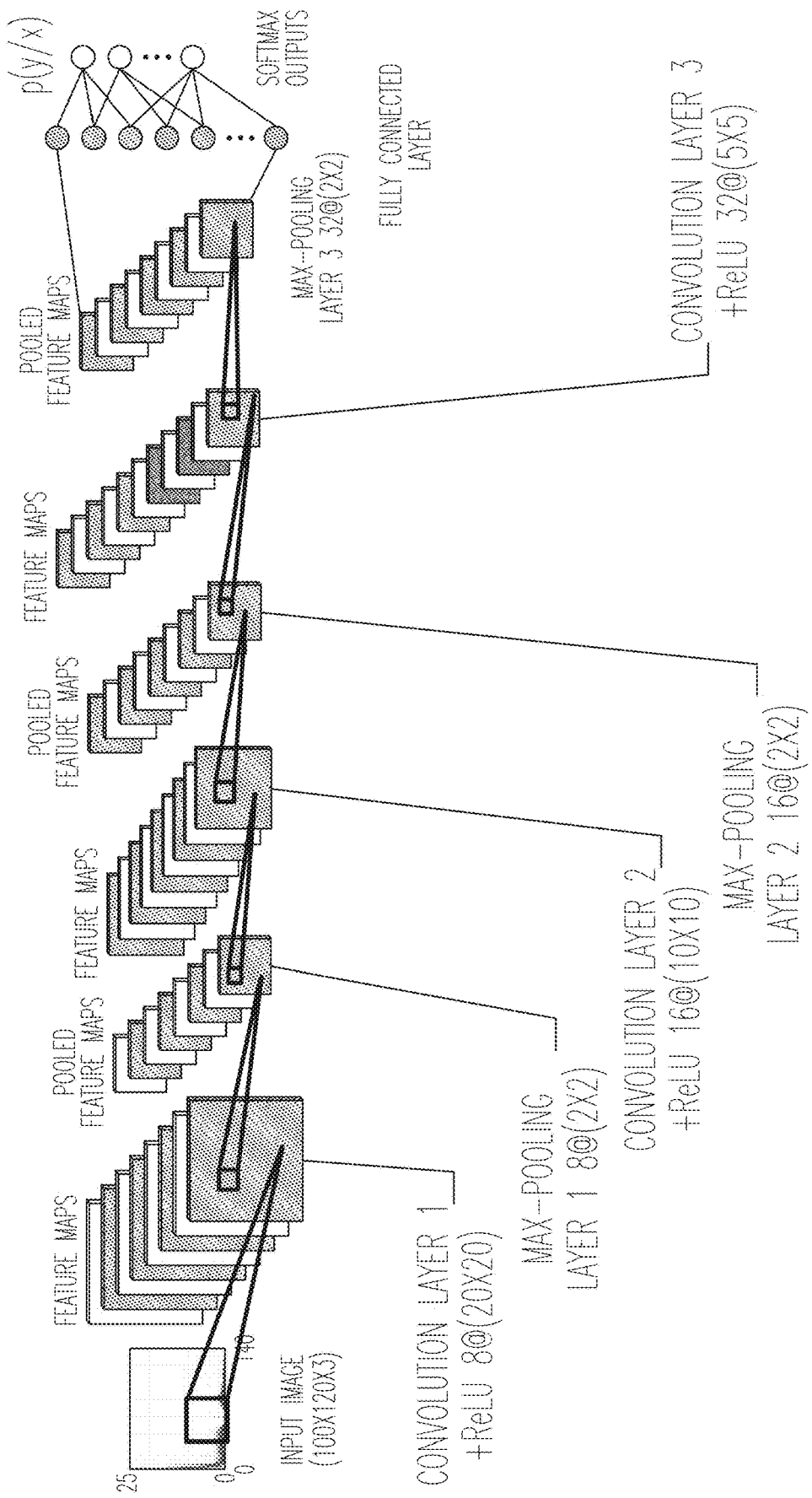
FIG. 10 is an illustrative diagram of an example third DCNN of an example third machine learning-trained engine.

FIG. 8 is an illustrative diagram of an example first deep convolutional neural network (DCNN) 800 of an example first machine learning-trained engine, to classify IR information produced using the IR camera 116. FIG. 9 is an illustrative diagram of an example second DCNN 900 of an example second machine learning-trained engine, to classify radar information produced using the micro-Doppler radar 112. FIG. 10 is an illustrative diagram of an example third DCNN 1000 of an example third machine learning-trained engine, to classify audio information produced using the microphone array 118. The processing circuit 102 is configured to operate as the first DCNN machine learning-trained engine 800, to operate as the second DCNN machine learning-trained engine 900, and to operate as the third DCNN machine learning-trained engine 1000. The structure and organization of the first, second, and third DCNN machine learning-trained engines 800, 900, 1000 of FIGS. 8-10 are similar and for economy of description, they will be described together as a group.

Referring to FIGS. 8-10, a DCNN includes a CNN but with multiple convolution layers, and therefore, is characterized as being "Deep". An example DCNN includes four types of layers. A first of the four types of layers is a convolutional layer $802_1$-$802_3$, $902_1$-$902_3$, $1002_1$-$1002_3$. A function of the convolutional layer is to transform an input image to extract certain features from the image. For feature extraction, the convolutional layer uses a kernel (not shown). A kernel comprises a matrix of different weights. The final step of convolution process is to perform a dot product operation between the weights of the input image and the weights of the kernel. Ordinarily, the kernel will have smaller dimensions than that of the input image. A first convolutional layer is applied to an input image to obtain extracted features. A next type of layer included in an example DCNN is a pooling layer $804_1$-$804_3$, $904_1$-$904_3$, $1004_1$-$1004_3$. A function of the pooling layer is to reduce the spatial size of features extracted from a convolutional layer. The pooling layer does this by applying a sliding filter (not shown) over the output feature from the convolutional layer. One specific method of pooling, known as max pooling, finds the largest value from the sliding filter. The top features extracted from the first convolutional layer will be passed to the next convolutional layer and the process will repeat. Next, a third type of layer included in an example DCNN is a fully connected layer 806, 906, 1006. A function of the fully connected layer is to take the output from the final pooling layer and finally start learning. The fully connected layer includes a sub-layer called the hidden layer that includes connected neurons, which operate to compute the average weight from an input and then provide an output value. An example DCNN can include multiple hidden layers depending on the DCNN architecture. The output from the hidden layer is a Softmax output 808, 908, 1008. A final layer determines a classification decision based upon which neurons are activated. For example, assume that a final pooling layer includes two features identified. Depending on which features are most prevalent, certain neurons will activate while others will remain dormant. A final layer of an example DCNN is the output layer. The output layer is responsible for making a final decision for classification of the input image using all of the prior information from the previous layers. The output layer has neurons that activate depending on what the final decision is. Each of these neurons represents a label. When all of the above layers that make up a DCNN discussed are assembled together, the architecture of a DCNN for image classification is complete as shown in each of FIGS. 8-10.

During training, testing and use operations, the input images provided to the first, second, and third DCNN machine learning-trained engines 800, 900, 1000, respectively include a resized IR image 810 of the scene, a spectrogram representation 910 of the digital radar voltage signal produced based upon RF radar signal reflected from the scene, and a frequency spectrum representation 1010 of an audio signal captured from the scene. In the example first, second, and third DCNN machine learning-trained engines 800, 900, 1000, the dimension of each of the input images is 100×120×3 (RGB) image.

Figure 11A:
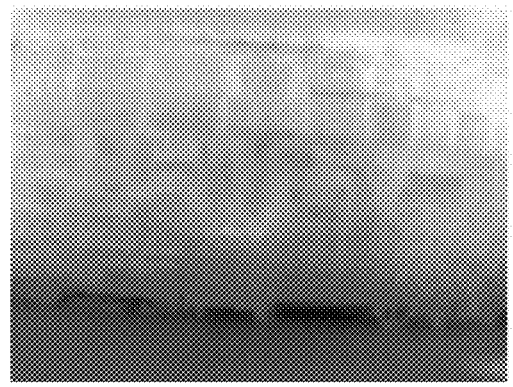
FIGS. 11A-11B are example IR images in which no human is sensed (FIG. 11A) and in which a human is sensed (FIG. 11B).
Figure 11B:
Figure 12A:
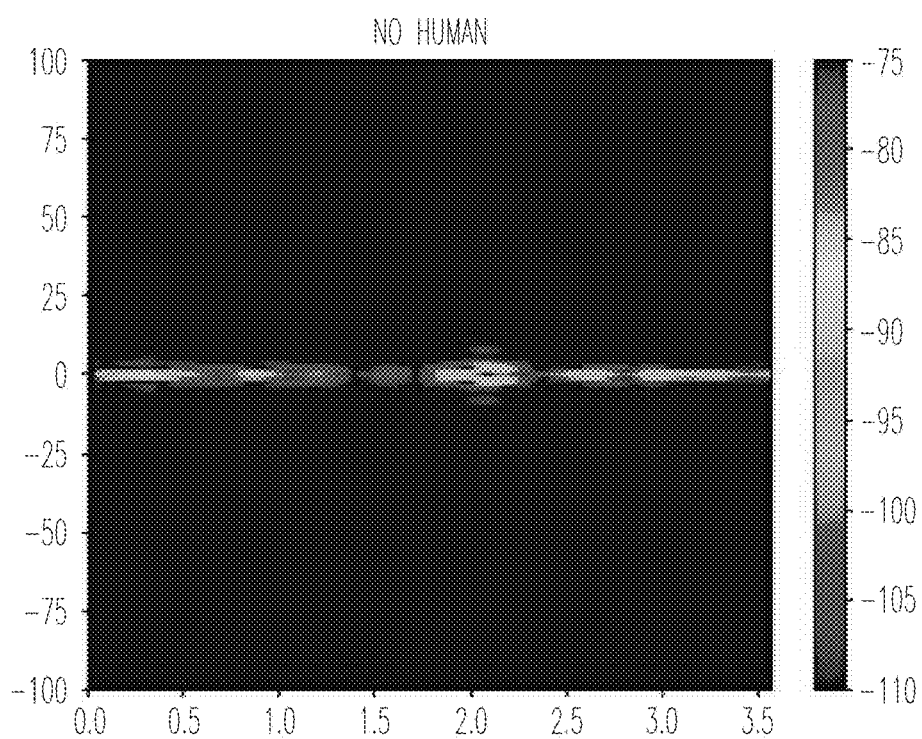
FIGS. 12A-12B are example spectrograms of a radar signals in which no human is sensed (FIG. 12A) and in which a human is sensed (FIG. 12B).
Figure 12B:
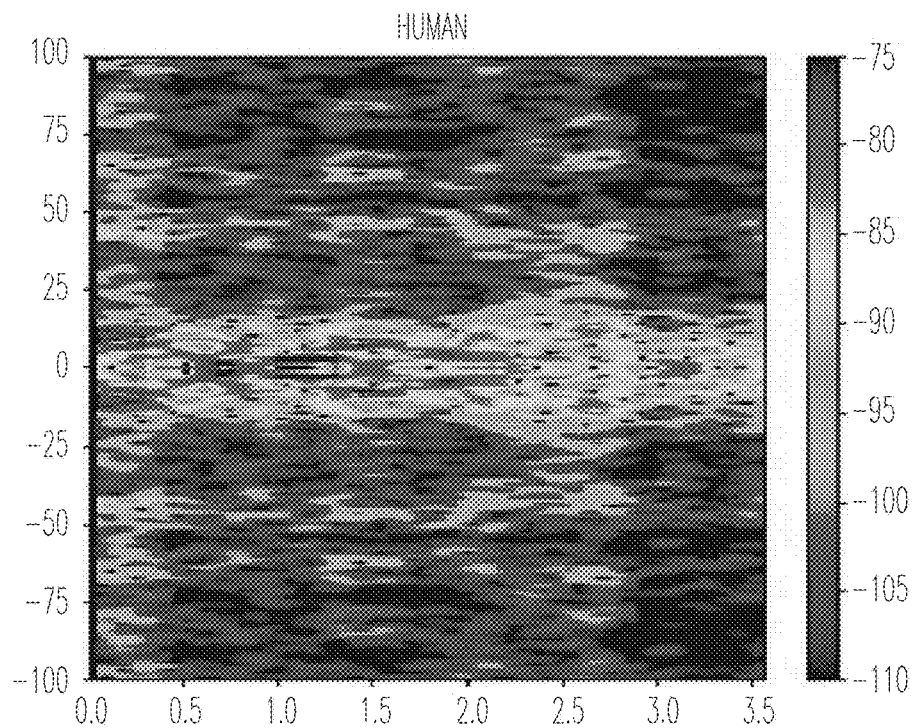

FIGS. 11A-11B are example IR images in which no human is sensed (FIG. 11A) and in which a human is sensed (FIG. 11B), which can be input to the first DCNN. FIGS. 12A-12B are example spectrograms of a radar signals in which no human is sensed (FIG. 12A) and in which a human is sensed (FIG. 12B), which can be input to the second DCNN. The vertical axis of the spectrogram indicates Doppler frequency (Hertz). The horizontal axis of the spectrogram indicates the time elapsed (seconds).

Referring again to FIGS. 8-10, the respective input image data (IR image, radar spectrogram, audio frequency spectrum) undergo feature extraction network by first being processed by the convolution layer $802_1$, $902_1$, $1002_1$ including, as an example, 8 convolution filters of size 20×20. The output from the convolution layer goes through the rectified linear unit (ReLU) function followed by the pooling layer $804_1$, $904_1$, $1004_1$, which employs max pooling process of 2×2 matrices. This process is repeated multiple times to create the output and train a machine learning-trained engine with inherent features of the image. The output of the pooling layer is fed into a second convolution layer $802_2$, $902_2$, $1002_2$ including, as an example, 16 convolution filters of size 10×10. Similarly, after passing the output through the ReLU function it undergoes the pooling layer $804_2$, $904_2$, $1004_2$ with max pooling size of 2×2 matrices. Finally, the output is passed through a third round of convolution layer $802_3$, $902_3$, $1002_3$ including, as an example, 32 convolution filters of size 5×5 after which it is processed by the ReLU function and the pooling layer $804_3$, $904_3$, $1004_3$ with max pooling size of 2×2 matrices. Max pooling is a down-sampling process where it selects the maximum value from each view. Since the spectrogram images contain sharp edges max pooling instead of average pooling is used to extract the most important features such as edges. The classifier network includes a fully connected layer 806, 906, 1006 comprising 100 hidden nodes, which produce a Softmax output 808, 908, 1008 that in turn is used for classifying the outputs.

Figure 13:
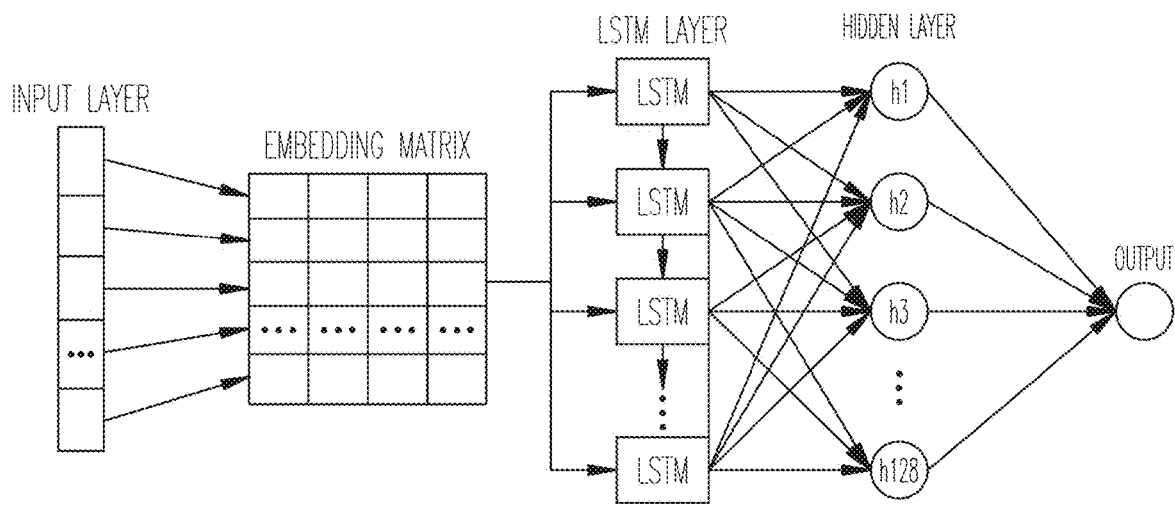
FIG. 13 is an illustrative diagram representing the example fourth neural network machine learning-trained engine to interpret speech content of audio information.

FIG. 13 is an illustrative diagram representing the example fourth neural network machine learning-trained engine that includes a long short-term memory (LSTM) recurrent neural network (RNN) 1300 machine learning-trained engine, which is suitable for processing sequences of data such as speech. An example LSTM network architecture shown in FIG. 13 includes an input layer 1302, a recurrent LSTM layer 1304 and an output layer 1306. The input layer 1302 is connected to the LSTM layer 1304. The input layer is fed with an audio spectrogram (not shown) produced based upon audio data captured by the microphone array 118. An embedding matrix 1308 provides a mapping of a discrete categorical variable to a vector of continuous numbers. The recurrent connections in the LSTM layer 1304 are coupled directly from the cell output units to the cell input units, input gates, output gates and forget gates. The cell output units are connected to the output layer 1306 of the network. The cell remembers values over arbitrary time intervals and the three gates regulate the flow of information into and out of the cell. Each spectrogram image as an input will have unique characteristics and image shape that when fed into the network 1300 will be able to be classified to its corresponding label at the output layer 1306. An alternative example system (not shown) uses a fourth machine learning-trained engine that includes a deep feed forward neural network for speech recognition. Another alternative example system (not shown) uses Hidden Markov models for speech recognition, instead of using neural network-based speech recognition. Another alternative example system uses dynamic time warping (DTW)-based speech recognition, instead of using neural network-based speech recognition. Another alternative example system (not shown) uses end-to-end automatic speech recognition, instead of using neural network-based speech recognition.

Figure 14:
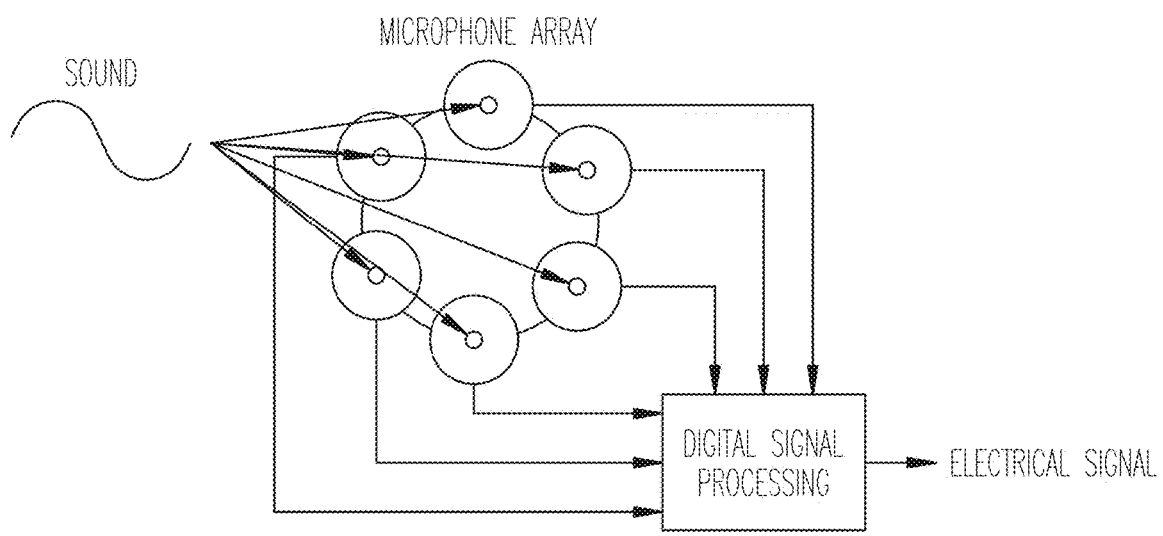
FIG. 14 is an illustrative drawing representing geometric arrangement of microphones of an example microphone array.

FIG. 14 is an illustrative drawing representing geometric arrangement of microphones 118 of an example microphone array. The microphones $118_1$-$118_6$ are located spaced apart from one another such that each microphone of the microphone array will sense a sound wave 1402 from a sound source 1404 at different moment in time. Since each microphone has a different geometric location in the microphone array, each microphone also has a different distance from a sound source. The different distances of the different microphones from a sound source results in corresponding differences in the delay between the launching of a sound wave at a sound source and arrival of the sound wave at the different microphones. The processor system 102 is configured to measure differences in delays and to determine direction of arrival (DOA) of the sound wave based upon the measured delay differences. For example, the far left microphone $118_1$ at the 10 pm location will have picked up a sound wave 1402 produced by an example sound source shown in FIG. 11 before the other microphones because the far left microphone $118_1$ is closest to the sound source while the far right microphone $118_4$ at the 2 pm location will pick the sound the last because the far right microphone $118_4$ is farthest from the sound source and the sound wave 1402, therefore, the delay will be longer due to the longer flight time required for the sound wave to reach the far right microphone $118_4$. Thus, the processor circuitry 102 is configured to determine a DOA estimate based upon the difference in arrival times of a sound wave at different microphones. Honghao Tang, (Tang, H. (2014). DOA estimation based on MUSIC algorithm) discloses DOA estimation based on the MUSIC (MUltiple SIgnal Classification) algorithm. H. Kulhandjian et al. 2-D DOA Estimation of Coherent Wideband Signals with Auxillary-Vector Basis, IEEE 2018 (H. Kulhandjian, M. Kulhandjian, Y. Kim, C. D'Amours, "2-D DOA Estimation of Coherent Wideband Signals with Auxiliary-Vector Basis," in Proc. of IEEE Intl. Conf. on Communications (ICC) Workshop on Advances in Network Localization and Navigation (ANLN), Kansas City, MO, USA, May 2018, disclose determining two-dimensional direction of arrival of sound.

Localization distance of a sound source relative to the microphone array 118 is determined based upon sound volume. A higher (louder) sound volume indicates a sound source that is closer. A lower (softer) sound volume indicates a sound source that is farther away. The distance can be estimated by having different sound volumes low volume indicate the person is farther away higher volume of sound the person is closer by. The processing circuit 102 is configured to estimate localized distance of a sound source based upon volume of sound received from the source 1404.

Figure 15:
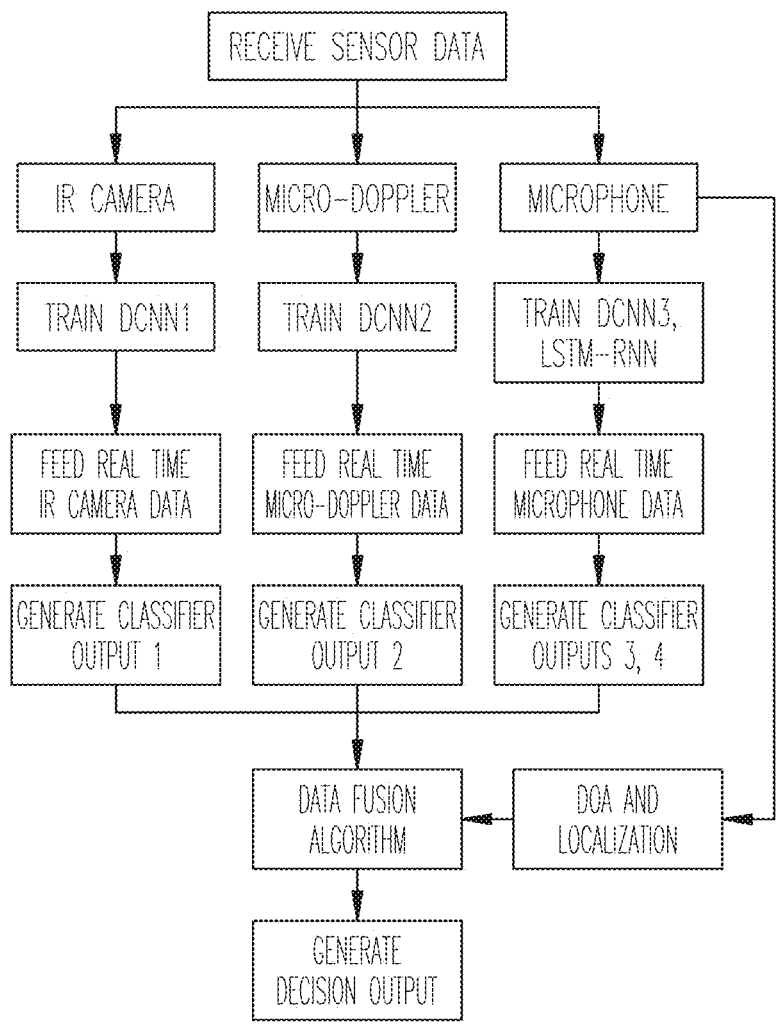
FIG. 15 is an illustrative flow diagram representing a real-time processing of scene information by the system of FIG. 1.

FIG. 15 is an illustrative flow diagram representing a real-time processing of scene information 1500 by the system 100 of FIG. 1. The flow diagram of FIG. 15 provides additional details of the operation of the multiple neural networks during the testing and use operations data flow path 604 of FIG. 6 and also, adds DOA and localization. IR information is received at the IR camera 116. Radar information is received at the micro-Doppler radar sensor 112. Audio information is received at the microphone sensor 118. IR data produced by the IR camera in response to the IR information is provided to a trained first DCNN machine learning-trained engine 800, which uses the real-time IR camera data 1502 to produce a first classification output $1504_1$, based upon the real-time IR data. Radar data produced by the radar sensor 112 and transformed to a spectrogram representation is provided to a second trained DCNN machine learning-trained engine 900, which uses the real-time transformed radar data 1506 to produce a second classification output 1508$_2$, based upon the real-time radar data. Microphone data 1510 transformed to a frequency spectrum representation is provided to a third trained DCNN machine learning-trained engine 1000, which uses the real-time transformed audio 1510 to produce a third classification output 1512$_3$ based upon the audio data. Microphone data transformed to a spectrogram representation are provided to a trained long short-term memory (LSTM) recurrent neural network (RNN) machine learning-trained engine 1300, which uses the real-time transformed audio to produce a fourth classification output 1512$_4$ based upon the audio data. Microphone data is provided to a DOA and localization block 1514, which determines sound DOA based upon time of sound wave arrival at different microphones of a microphone array and determines localization distance based upon sound volume. A data fusion block 1516 fuses first, second, third and fourth classifications and DOA and localization information to produce a multivariate decision output at the decision block 1508.

Figure 16:
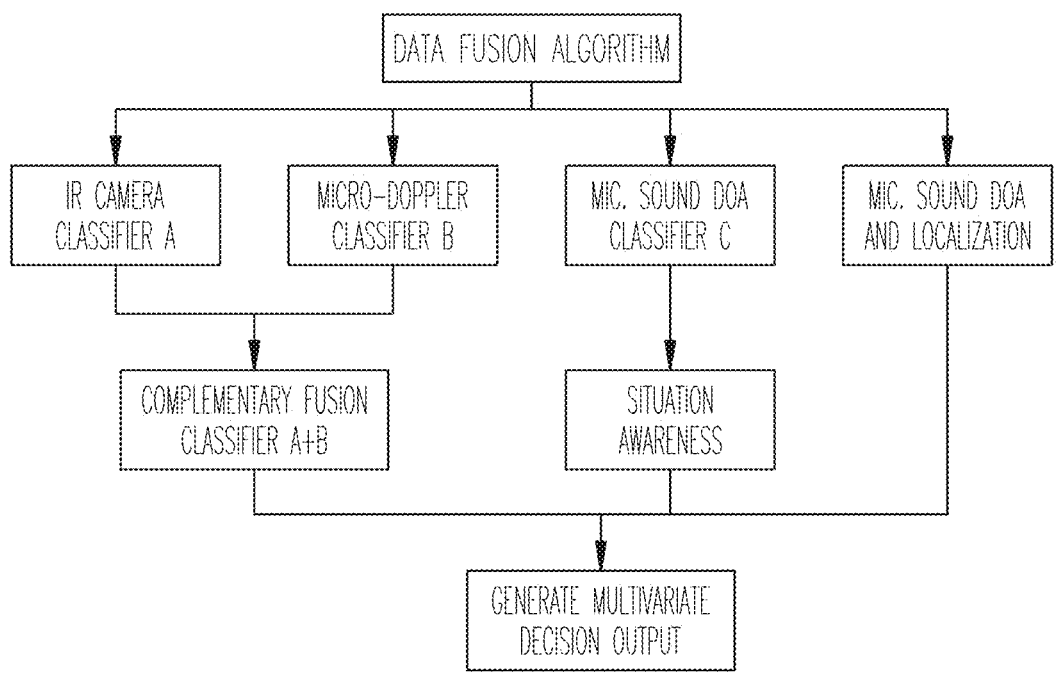
FIG. 16 is an illustrative diagram representing example data fusion logic.

FIG. 16 is an illustrative diagram representing example data fusion logic 1600. A complementary data fusion logic operation compares the different classifiers produced and combine those classifications 1602 using the first (IR camera) DCNN and using the second (radar) DCNN. An IR camera 116 generally is more effective than a micro-Doppler radar 112 at sensing human/animal at closer proximity and with little movement, e.g., human/animal sleeping, standing, seating and is less effective at sensing human/animal at fairly farther distances and with fast motion, e.g., running. A micro-Doppler radar 112 generally is more effective than an IR camera 116 at sensing human/animal at relatively farther proximity and with a lot of movement, e.g., running, waiving, etc. and is less effective at sensing human/animal at closer proximity and with little movement, e.g., human/animal sleeping, standing, seating. Therefore, IR and micro-Doppler are complementary to one another, and fusion of the IR-based and radar-based classifications allows detection of human/animal with high or low or even no motion, far and near distances. A situation awareness logic 1604 operation uses classifications produced using the third DCNN 1000 based upon an audio frequency spectrum representation of audio data and uses interpretation of audio content produced using the LSTM-RNN 1300 based upon a spectrogram representation of the audio data to produce. The classifications produced by the example third (audio) DCNN algorithm 1000 provides further detailed hierarchical classification whether the detected subject is a child a man, a woman, an elderly or a cat, dog. The classifications produced by the example LSTM-RNN 1300 based training provides further situation awareness on what is being said, e.g., a child is crying, a woman is calling for help, a man shouting my child is suffocating or not breathing, a dog is barking, etc.

These types of information provide another dimensionality to the human/animal detection on the scene. They provide "situation awareness" by delivering more detailed information on what is taking place on the scene, which can be used to better assess the scene/situation and accordingly make the best decision possible to save more lives and or animals by sending the fireman crew to the right location with the right tools. The audio DOA and audio localization distance produce information useful to know the direction and location of a subject (person or animal) that needs help. The decision output 1508 combines results of the different classification outputs 1602, 1604 along with the DOA and localization operation 1514 to produce a multivariate decision output.

An example of such multivariate decision could be "a child on the second floor in the south facing bedroom is crying and is calling for help", another example is "a woman in the first floor master bedroom is shouting my baby is in the upstairs bedroom please help." The data fusion of these multivariate data could be of profound use as it not only detects the objects but it provides to the parties of much deeper information with details on what is taking place on the scene with fine grained details as who is there and what type of help is needed so that appropriate rescue personnel will be sent to the right location having the localization information.

Figure 17A:
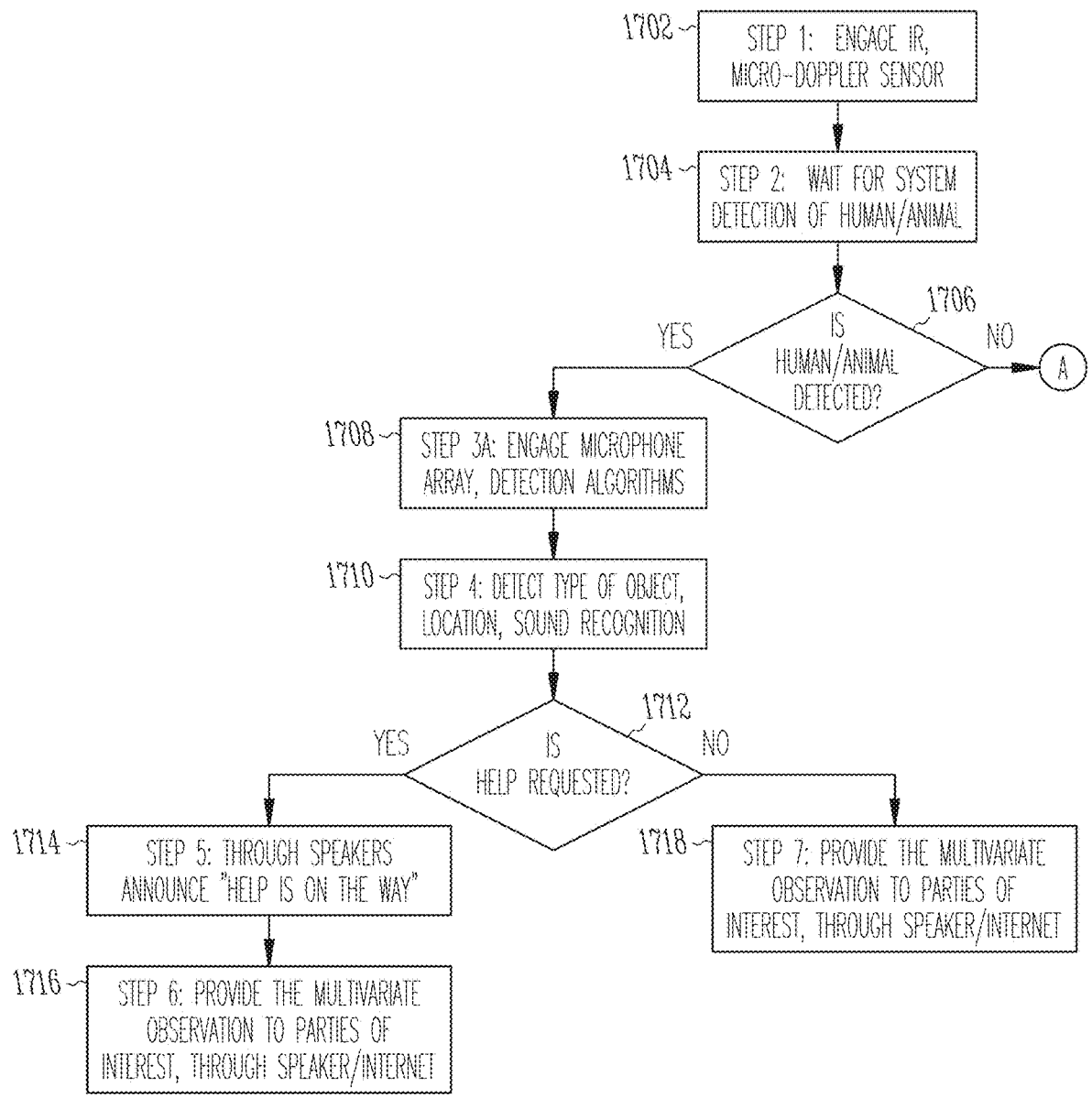
FIGS. 17A-17B are illustrative flow diagrams representing an example search procedure that can be performed using the system.
Figure 17B:
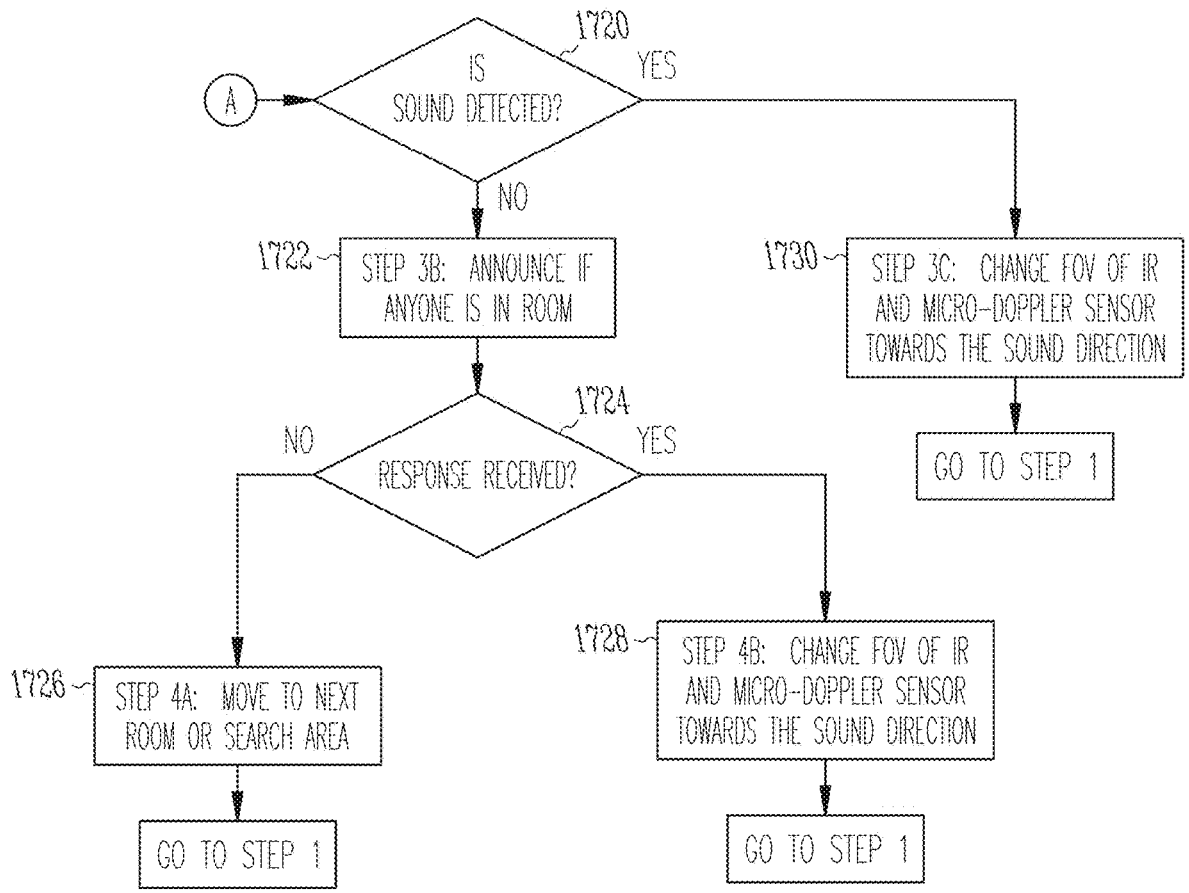

FIGS. 17A-17B are illustrative flow diagrams_representing an example search procedure 1700 that can be performed using the system. The search procedure 1700 can be used to search a structure such as that shown in FIG. 5, for example. The processor system is configured with instructions to perform operations to control the search procedure. At operation 1702, the IR camera and the micro-Doppler sensor are engaged. At operation 1704, the IR/radar DCNN algorithms are run, and the process waits for detection of Human/Animal. Decision operation 1706 determines whether a Human/Animal is detected. In response to detection of a Human Animal at decision operation 1706, operation 1708 engages sound detection. At operation 1710, the audio DCNN and LSTM algorithms and the DOA and location processes are run. The process 1700 waits for determination of recognition (classification (e.g., human/man/near distance, human/woman/near distance etc., and sound content recognition). These activities are performed as background to the data fusion process. Decision operation 1712 determines whether help is requested. In response to a determination at decision operation 1712 that help is requested, operation 1714 announces through the speaker that "Help is on the way.". Operation 1716 provides a multivariate observation to parties of interest (e.g., over the Internet to over the speaker) based upon output of the data fusion process. In response to a decision at decision operation that no help is requested, operation 1718 provides a multivariate observation to parties of interest based upon output of the data fusion process.

In response to no detection of a Human/Animal at decision operation 1706, operation 1720 determines whether sound is detected. In response to a determination that no sound is detected, the operation 1722 causes the speaker to send an announcement "Is anyone in the room?". Decision operation 1724 determines whether a response is received. In response to a determination at operation 1724 that no response is received, operation 1726 causes the system travel to the next search region, which could be a different room in the building of FIG. 5, for example. The GPS system provides location information that the system can use to instruct a user of the handheld device of FIGS. 2A-2B, the drone operator of the drone of FIG. 3, or the operator of the robot of FIG. 4, where to next search and how to proceed to the next search region (e.g., to indicate locations of doors relative to the location of the handheld device/drone/robot. Control next flows back to operation 1702. In response to a determination at operation 1724 that a response is received, operation 1728 changes the direction of the field of view of the IR/radar sensors to the direction of the source of the response. Control then flows back to operation 1702. In response to a determination at operation 1720 that sound is detected, operation 1730 changes the direction of the field of view of the IR/radar sensors to the direction of the source of the response. Control then flows back to operation 1702.

The invention claimed is:

1. A system to search in a low visibility environment comprising:
   one or more infrared (IR) sensors configured to receive IR image data from within a first field of view;
   one or more radar units configured to receive radar data from within the first field of view;
   one or more microphones configured to receive audio data from within a second field of view, the second field of view wider than and encompassing the first field of view;
   a speaker;
   processing circuitry;
   a non-transitory memory storing instructions, which, when executed by the processing circuitry, cause the processing circuitry to perform operations comprising:
   transmitting on the speaker sound that includes speech content within the second field of view, while the one or more IR sensors receive IR image data from within the first field of view and the one or more radar units receive radar data from within the first field of view;
   determining using a first machine learning-trained engine, based upon the IR image data, a first classification output that includes a first classification representing presence or absence of at least one of an animal and a human within the first field of view, wherein the first machine learning-trained engine is trained based on a dataset of training IR images;
   determining using a second machine learning-trained engine, based upon the radar data, a second classification output that includes a second classification representing presence or absence of at least one of an animal and a human within the first field of view, wherein the second machine learning-trained engine is trained based on a dataset of training radar data;
   determining using a third machine learning-trained engine, based upon audio data, a third classification output that includes a third classification indicating speech content of sound within the second field of view, wherein the third machine learning-trained engine is trained based on a dataset that includes training speech sounds; and
   determining whether classified speech content, classified using the third machine learning-trained engine, is responsive to the speaker sound that includes the transmitted speech content transmitted within the second field of view.

2. The system of claim 1, the operations further including:
   determining using a fourth machine learning-trained engine, based upon the audio data, a fourth classification output that includes a fourth classification representing presence or absence of at least one of an animal and a human within the second field of view, wherein the fourth machine learning-trained engine is trained based on a dataset of training audio data; and.

3. The system of claim 1, the operations further including:
   determining a direction of arrival at the one or more microphones, of unclassified sound produced by a sound source within the second field of view; and
   changing the first field of view of the one or more IR sensors and of the one or more radar units to encompass the determined direction of arrival of the sound.

4. The system of claim 1 further including:
   determining a distance between the sound source and the one or more microphones.

5. The system of claim 1,
   wherein the first machine learning-trained engine includes a first deep convolutional neural network (DCNN); and
   wherein the second machine learning-trained engine includes a second DCNN.

6. The system of claim 5 further including:
   transforming the accessed radar data to a spectrogram representation; and
   wherein determining using a second machine learning-trained engine includes determining based upon the spectrogram representation of the radar data.

7. The system of claim 1,
   wherein the third machine learning-trained engine includes a long short-term memory (LSTM) Recurrent Neural Network (RNN).

8. The system of claim 2,
   wherein the fourth machine learning-trained engine includes a neural network; and further including:
   transforming the accessed audio data to a spectrogram representation; and
   wherein determining using the fourth machine learning-trained engine includes determining based upon the spectrogram representation of the audio data.

9. The system of claim 2,
   wherein the fourth machine learning-trained engine includes a third DCNN; and further including:
   transforming the accessed audio data to a frequency spectrum representation;
   wherein determining using the third machine learning-trained engine includes determining based upon the frequency spectrum representation of the audio data.

10. The system of claim 1 further including:
    a display screen; and
    the operations further including:
    fusing the first and second classification outputs to produce a fusion classification output;
    in response to the fusion classification output indicating a presence of at least one of a human and an animal within the first field of view, displaying on the display screen an indication of the detected presence of the at least one of a human and an animal within the first field of view.

11. The system of claim 2,
    the operations further including:
    in response to the fourth classification output indicating a presence of at least one of a human and an animal within the second field of view, transmitting on the speaker an indication of the detected presence of the at least one of a human and an animal within the second field of view.

12. The system of claim 2 further including:
    a display screen; and
    the operations further including:
    fusing the first and second classification outputs to produce a fusion classification output;
    in response to the fusion classification output indicating a presence of at least one of a human and an animal with the first field of view, displaying on the display screen an indication of the detected presence of the at least one of a human and an animal with the first field of view; and
    in response to the fourth classification output indicating a presence of at least one of a human and an animal with the second field of view, transmitting on the speaker an indication of the detected presence of the at least one of a human and an animal within the second field of view.

13. A method to search in a low visibility environment comprising:
- receiving at an IR sensor IR image data from within a first field of view;
- receiving at a radar unit radar data from within the first field of view;
- receiving at one or more microphones audio data from within a second field of view, the second field of view wider than the first field of view and encompassing the first field of view;
- transmitting on a speaker sound that includes speech content within the second field of view, while the IR image data the radar data are received from within the first field of view;
- determining using a first machine learning-trained engine, based upon the IR data, a first classification output that includes a first classification representing presence or absence of at least one of an animal and a human within the first field of view, wherein the first machine learning-trained engine is trained based on a dataset of training IR images;
- determining using a second machine learning-trained engine, based upon the radar data, a second classification output that includes a second classification representing presence or absence of at least one of an animal and a human within the first field of view, wherein the second machine learning-trained engine is trained based on a dataset of training radar data;
- determining using a third machine learning-trained engine, based upon the audio data, a third classification output that includes a third classification indicating speech content within the second field of view, wherein the third machine learning-trained engine is trained based on a dataset that includes training speech sounds; and
- determining whether classified speech content, classified using the third machine learning-trained engine, is responsive to the speaker sound that includes the transmitted speech content transmitted within the second field of view.

14. The method of claim 13 further including:
- determining using a fourth machine learning-trained engine, based upon the audio data, a fourth classification output that includes a fourth classification representing presence or absence of at least one of an animal and a human within the second field of view, wherein the fourth machine learning-trained engine is trained based on a dataset that includes training audio data.

15. The method of claim 13 further including:
- determining a direction of arrival at the one or more microphones of unclassified sound produced by a sound source within the second field of view; and
- changing the first field of view to encompass the determined direction of arrival of the sound.

16. The system of claim 13 further including:
- determining a distance between the sound source and the one or more microphones.

17. The method of claim 13 further including:
- fusing the first and second classification outputs to produce a fusion classification output;
- in response to the fusion classification output indicating a presence of at least one of a human and an animal with the first field of view, displaying on a display screen an indication of the detected presence of the at least one of a human and an animal with the first field of view.

18. The system of claim 1 further including:
- a network interface;
- the operations further including:
- fusing the first and second classification outputs to produce a fusion classification output;
- determining a direction of arrival at the one or more microphones of a sound produced by a sound source within the second field of view and changing the first field of view of the one or more IR sensors and of the one or more radar units to encompass a direction of arrival of the sound response to the second message; and
- in response to detecting at least one of a human and an animal within the first field of view, based at least in part upon the fusion classification output, transmitting a multivariate observation over the network.

19. The system of claim 1, the operations further including:
- determining a direction of arrival at the one or more microphones, of classified sound, classified using the third machine learning-trained engine, produced by a sound source within the second field of view; and
- changing the first field of view of the one or more IR sensors and of the one or more radar units to encompass the determined direction of arrival of the sound.

20. The system of claim 1, the operations further including:
- fusing the first and second classification outputs to produce a fusion classification output.

21. The system of claim 2, the operations further including:
- fusing the first, second, third, and fourth classification outputs to produce a fusion classification output.

22. The system of claim 3, wherein the one or more microphones in include a microphone array that includes multiple microphones arranged such that each microphone in the array receives an unclassified sound from within the second field of view at a different moment in time.

23. The system of claim 19, wherein the one or more microphones include a microphone array that includes multiple microphones arranged such that each microphone in the array receives a classified sound from within the second field of view at a different moment in time.

* * * * *